United States Patent [19]
Watson

[11] 3,873,211
[45] Mar. 25, 1975

[54] HOLE MEASURER CONTROLLER

[75] Inventor: Robert L. Watson, Bluff City, Tenn.

[73] Assignee: Eastman Kodak Company, Rochester, N.Y.

[22] Filed: Jan. 23, 1974

[21] Appl. No.: 435,920

[52] U.S. Cl............. 356/156, 356/157, 356/167, 356/237, 356/241, 250/578
[51] Int. Cl. ................................. G01b 11/00
[58] Field of Search .......... 356/156, 157, 167, 237, 356/241; 250/571, 572, 578, 235

[56] References Cited
UNITED STATES PATENTS
3,806,252    4/1974    Harris et al.................. 356/156

*Primary Examiner*—Ronald L. Wibert
*Assistant Examiner*—Paul K. Godwin

[57] ABSTRACT

Disclosed is a controller for a device which measures the length and diameter of a capillary of a spinneret.

A first laser beam is positioned upon the capillary at a first angle with regard to the axis of the capillary and a second laser beam is positioned upon the capillary at a second angle with regard to the axis of the capillary. The beams are oscillated along the radius of the spinneret and the quantity of energy in the portion of each of the beams that pass through a capillary is sensed and the ratio of the sensed quantities of energy is determined. The radial oscillation of the beams results from operation of a galvanometer driven by a periodic signal having a voltage directly proportional to time. Thus, the first and second laser beams are oscillated so as to position the first laser beam at an angle with regard to the axis of the capillary that is proportional to the value of the voltage of the periodic signal driving the galvanometer. The ratio of the length and diameter of the capillary are mathematically correlated in terms of the relationship between the first and second angles and the ratio of the sensed quantities of energy. The mathematical correlation is then solved for the ratio of the length and diameter. The length of the capillary is then determined by multiplying the ratio of the length and diameter by a value reflective of the diameter of the capillary. The diameter of the capillary can be determined by solving a mathematical correlation of the diameter of the capillary in terms of the energy in the portion of the first beam passing through the capillary.

According to this invention, the above described device is controlled so as to position the axis of the capillary coincident with the axis of the first laser beam by translating the rotating spinneret along the radius of the spinneret. Radial translation of the rotating spinneret is accomplished by the steps of generating a periodic sampling signal having a sampling period of predetermined duration, the sampling period corresponding in time to the maximum amplitude of the electrical signal representing the quantity of energy sensed in the portion of the first laser beam that passes through the capillary, sensing the value of the voltage of the periodic signal driving the galvanometer during the sampling period of the periodic sampling signal, generating an error signal reflective of the magnitude of the sensed voltage of the periodic signal during the sampling period of the periodic sampling signal, and radially translating the rotating spinneret at a rate reflective of the magnitude of the error signal.

8 Claims, 15 Drawing Figures

3,873,211
Fig. 1
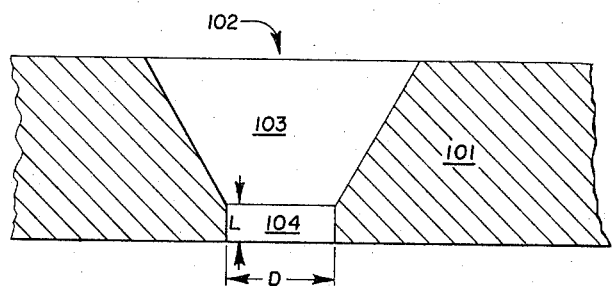
Fig. 2
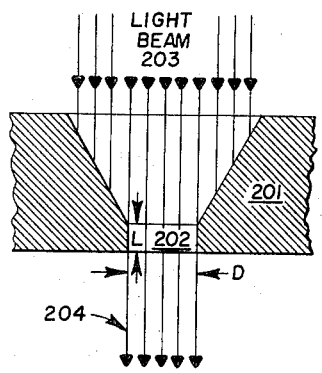
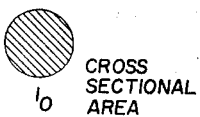
CROSS SECTIONAL AREA
$I_0$
Fig. 3
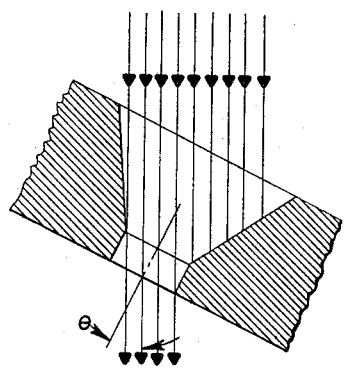
CROSS SECTIONAL AREA
$I_\theta$ $$I_\theta = \frac{I_o}{\pi} \left\{ 2 \cos\theta \sin^{-1}\left[\sqrt{1-\left(\frac{L}{D}\right)^2 \tan^2\theta}\right] - 2\left(\frac{L}{D}\right) \sin\theta \sqrt{1-\left(\frac{L}{D}\right)^2 \tan^2\theta} \right\}$$

Where:

$\theta$ = Angle between axis of capillary and light beam $I_\theta$ = Light intensity through the capillary when the angle between axis of capillary and light beam is $\theta$ degrees $I_o$ = Light intensity through the capillary when the angle between axis of capillary and light beam is zero degrees L = Capilary length D = Capilary diameter

*Fig. 4*

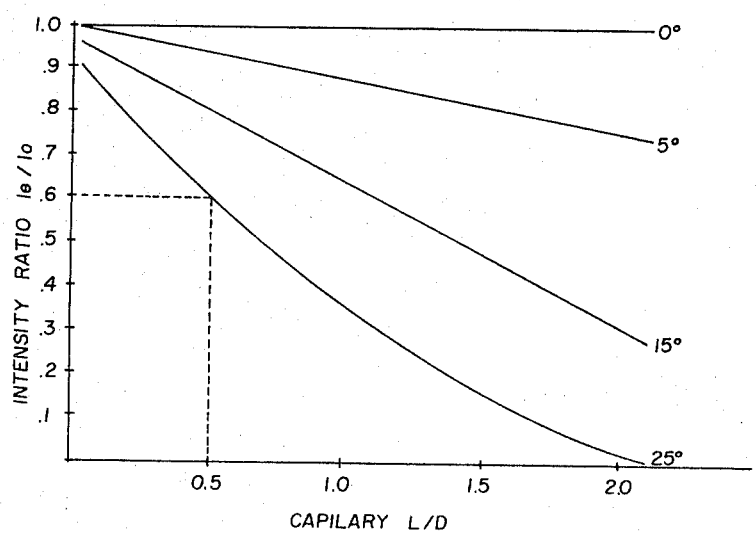

*Fig. 5*

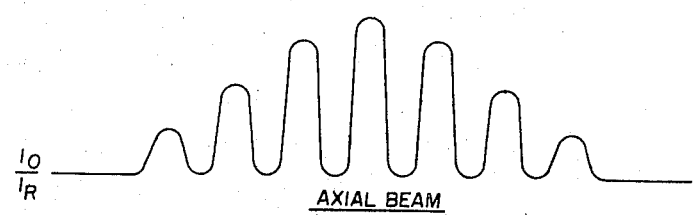
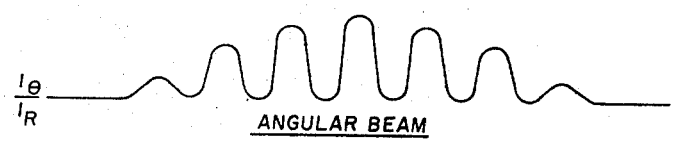
Fig. 8
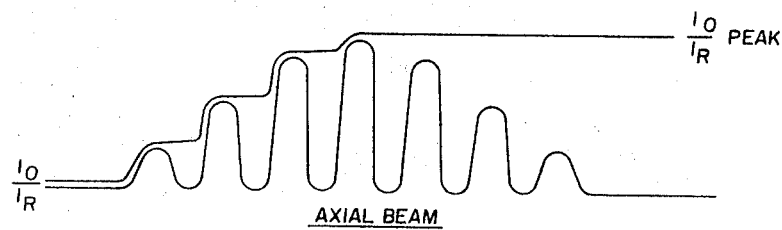
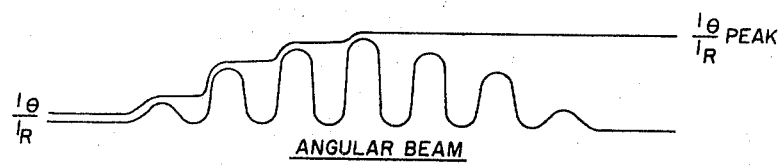
Fig. 9

*Fig. 13*

|  | Length | Diameter |
|---|---|---|
|  | 48.3 | 99.3 |
|  | 50.2 | 99.2 |
|  | 52.8 | 99.5 |
|  | 54.2 | 99.2 |
| n | 57.1 | n 98.8 |
|  | 50.2 | 99.1 |
|  | 51.5 | 99.0 |
|  | 50.0 | 99.3 |
|  | 48.5 | 99.2 |
|  | 48.8 | 99.1 |
|  | 48.4 | 99.3 |
| n | 44.6 | 99.9 |
| n | 44.0 | n 97.2 |
| n | 43.2 | 99.3 |
| n | 42.4 | 99.2 |
| n | 42.2 | 99.4 |
| n | 42.9 | 99.5 |
| n | 42.7 | 99.6 |
| n | 41.8 | 99.3 |
| n | 44.1 | 99.3 |
|  | 45.4 | 99.3 |
|  | 46.9 | 99.3 |

|  | Length | Diameter |
|---|---|---|
| Target | 50u | 100u |
| Tolerance | ±5u | ±1u |

HOLE MEASURER CONTROLLER

This invention relates to controlling the measurement of both the length and diameter of a capillary in a spinneret as disclosed in U.S. application Ser. No. 270,360 now U.S. Pat. No. 3,806,252 filed July 10, 1972, by James E. Harris and Robert L. Watson.

PRIOR ART

Measurement of the length and diameter of holes in substrates is necessary in many industrial operations. When the holes are fairly large and the substrate fairly thick, such as a hole drilled to accommodate a bolt or bearing in a sheet or block of metal, measurement of the length and diameter of the hole can be accomplished using conventional linear measuring devices. When the holes become smaller and the substrate becomes thinner, such as in the manufacture of electrical circuit boards and air bearings, measurement becomes increasingly difficult until a point is reached that conventional linear measuring devices, such as rulers and tapes, can no longer be used. When the holes become very small and the substrates very thin, such as orifices in a spinneret used to extrude synthetic fibers or wave guides for microwave equipment, the problem is particularly acute.

As is well understood by those skilled in the art, the manufacture of synthetic fibers involves either melting a fiber forming polymer or alternatively dissolving a fiber forming polymer in a suitable solvent and thereafter extruding the molten or dissolved polymer through a plurality of very small holes, often called orifices, which are contained in a spinneret.

Referring to FIG. 1 there is illustrated a portion of a spinneret 101 containing an orifice 102 which comprises frusto-conical passageway portion 103 and right circular cylinder passageway portion 104 of diameter D and length L. Right circular cylinder passageway portion 104 is often called a capillary passageway, or merely a capillary, by those skilled in the art.

The length and diameter of the capillary are very important variables in the spinning of the synthetic fibers, and particularly continuous filament synthetic fibers. Variations in the length and diameter of the individual capillaries in a spinneret can affect various fiber properties, such as dye takeup, tenacity, modulus, elongation, and denier per filament uniformity. Variations in the length and diameter of the capillary can also affect the start-up efficiency of new spinnerets and the rate of spinneret pressure increase with time.

Although it is quite important that the length and diameter of each capillary in the spinneret be within close tolerances, actual measurement of the length and diameter of the individual capillaries in a spinneret is exceedingly difficult because of the small size of the capillary. In many embodiments spinneret capillary diameters of 40 microns, or even less, and capillary lengths of 5 microns, or even less, are used commercially. Obviously even the most precise conventional linear measuring device would be of little value in measuring the length and diameters of capillaries of this size.

Although conventional linear measuring devices cannot be effectively used, there is one entirely satisfactory method of measuring the length and diameter of a capillary.

In broad summary of the method of the prior art comprises directing a first electromagnetic beam through the capillary to be measured at a first angle with regard to the axis of the capillary, measuring the quantity of energy in the portion of the first electromagnetic beam that passes through the capillary, directing a second electromagnetic beam through the same capillary at a second angle with regard to the axis of the capillary, measuring the quantity of energy in the portion of the second electromagnetic beam that passes through the capillary, determining the ratio of the two measured quantities of energy, correlating the ratio of the length of the capillary and the diameter of the capillary in terms of the ratio of the two measured quantities of energy and the relationship between the first and second angles, determining the ratio of the length of the capillary to the diameter of the capillary by solving the correlation, and determining the value of the length of the capillary by multiplying the ratio of the length to diameter by a value reflective of the nominal diameter of the capillary or by a value of the diameter of the capillary determined by correlating the energy in the portion of the first electromagnetic beam passing through the capillary with the diameter of the capillary and solving the correlation for the diameter of the capillary.

In one specific embodiment of this prior art method a first laser beam is optically positioned upon a right circular cylinder capillary of an orifice in a spinneret and the position of the beam is substantially parallel to the axis of the spinneret. A second laser beam is optically positioned upon the capillary at a predetermined angle with regard to the axis of the spinneret. The beams are radially oscillated along the radius of the spinneret and the spinneret is rotated. The energy in the portion of the first beam passing through the hole is ratioed with the energy in the portion of the second light beam passing through the hole. The ratio of length of the capillary to the diameter of the capillary is then correlated in terms of the predetermined angle and the ratio of the energy in the first and second light beams. The correlation is then solved for the ratio of the length to diameter since the ratio of the energies of two light beams and the predetermined angle are known. The length is then determined by multiplying the ratio of the length to diameter by either a nominal diameter or a diameter determined by solving a correlation of the diameter of the capillary in terms of the energy in the portion of the first light beam passed through the hole.

A further understanding of the prior art is enhanced and facilitated by the attached FIGURES.

FIG. 1 is an elevation view in cross section of a portion of a spinneret having an orifice therein and a portion of the orifice is a capillary.

FIG. 2 is an elevation view in cross section of a light beam which is falling on an orifice of a spinneret and the light beam is oriented so that the light beam is parallel with regard to the axis of the capillary of the orifice.

FIG. 3 is the spinneret of FIG. 2 rotated so as to develop angle $\theta$ between the light beam and the axis of the capillary of the orifice.

FIG. 4 is an equation correlating the valves $I_\theta$, $I_o$, L, D and $\theta$.

FIG. 5 is a plot of the equation of FIG. 4 solved for various values of the angle $\theta$.

FIG. 8 is a schematic representation of two signals formed in the electronic circuitry of FIG. 12 by dividing the axial beam voltage signal $I_0$ and the angular beam voltage signal $I_\theta$ by the reference beam voltage signal $I_R$.

FIG. 9 is a schematic representation of the peak voltage signals formed in the electronic circuitry of FIG. 12 by sensing and retaining the value of the maximum amplitude oscillations of signals $I_0/I_R$ and $I_{\theta\ /IR}$ of FIG. 8.

FIG. 13 is an illustration of the printed readout of capillary length and diameter data determined using the prior art device.

Figure 6:
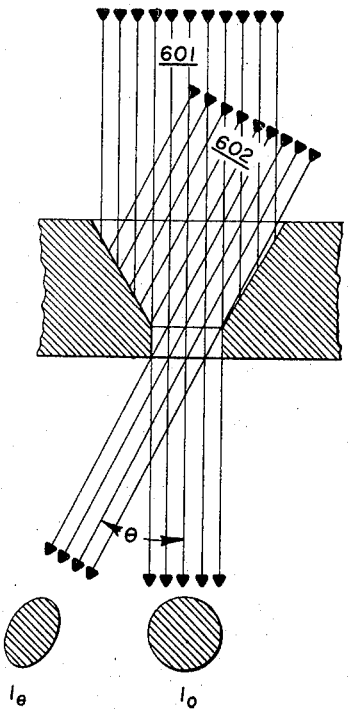
FIG. 6 is an elevation view in cross section of a spinneret orifice on which there is falling an axial light beam, which is oriented parallel to the axis of the capillary, and an angular light beam, which is oriented at angle $\theta$ with respect to the axis of the capillary.

A broad understanding of the prior art can be readily obtained by considering FIGS. 2–5.

Referring now to FIG. 2 there is shown spinneret 201 having capillary 202 of length L and diameter D oriented so that the axis of the capillary is parallel to light beam 203. Beam 203 can be conveniently thought of as the "axial" beam. The orientation of beam 203 parallel with regard to the axis of capillary 202 allows only a circular cross-sectional portion 204 of beam 203 to pass through capillary 202. The total energy, or intensity, of light beam 204 is designated I and a subscript indicating the angle between the axis of the capillary and the direction of beam 203 is then added. Since the angle between the axis of the capillary and the direction of beam 203 is zero, beam 203 is the axial beam and the designation for the energy in beam 204 is $I_0$. Since energy $I_0$ in beam 204 is proportional to the cross-sectional area of beam 204 and the area of a circle is proportional to the square of the diameter of the circle, therefore.

$$D^2 \alpha I_0$$

or $$D = K \sqrt{I_0}$$

Referring now to FIG. 3 there is shown the spinneret of FIG. 2 rotated to develop angle $\theta$ between the axis of the capillary and the direction of the light beam. When the capillary is tilted through angle $\theta$ the cross-sectional area of the beam coming through the capillary decreases, going from a circle, as shown in FIG. 2, to a near elliptical shape, as in FIG. 3. This beam that is at an angle with regard to the axis of the capillary can conveniently be thought of as the "angular" beam and the energy in the portion of the beam passing through the hole is designated $I_\theta$. This transition from a circular to near elliptical shape results in the energy in the beam passing through the capillary decreasing from $I_0$ to $I_\theta$. Since $I_0$, $I_\theta$, L, D and $\theta$ are interrelated, the relationship can be expressed broadly as $$I_\theta = \text{function of } I_0, L, D \text{ and } \theta$$

and can be expressed specifically by the equation shown in FIG. 4.

The equation of FIG. 4 is derived by considering a right circular cylinder of radius $r$ and length $L = $ the $2a$ with its major axis of symmetry lying along the $z$ of coordinate axis. When viewed along the z axis the cylinder is seen in cross section as a circle with area $A_0 = \pi r^2$. If the cylinder is rotated about the $x$ axis through an angle $\theta$, and again viewed along the z axis what is seen in the area $A_\theta$ which is formed by the intersection of two ellipses which are projections of the cylinder ends upon the x-y plane. The equation of the ellipse passing through the first quadrant is $$y(x) = \cos\theta \sqrt{r^2 - x^2} - a \sin\theta$$

and the area $A_\theta$ can be defined by the equation $$A_\theta = 4 \int_0^{x_m} y(x)dx$$

where $x_m = x(y)\bigg|_{y=0} = \sqrt{r^2 - a^2 \tan^2\theta}.$

Integration of the equation for $A_\theta$ yields the equation $$A_\theta = 2r^2 \cos\theta \sin^{-1}[\sqrt{1-(a^2/r^2)\tan^2\theta}] - 2a \sin\theta \sqrt{r^2 - a^2 \tan^2\theta}.$$

One then assumes the energy in the portion of the beam passing through the hole for any particular angle to be proportional to the crosssectional area of the portion of the beam passing through the hole, therefore $$I_\theta / I_0 = A_\theta / A_0$$

or $$I_\theta / I_0 = 2/\pi \{\cos\theta \sin^{-1}[\sqrt{1-(L/D)^2 \tan^2\theta}] - L/D \sin\theta \sqrt{1-(L/D)^2 \tan^2\theta}\}$$

where the substitutions $L = 2a$ and $D = 2r$ have been made.

If the equation correlating $I_\theta /I_0$ with L/D and $\theta$ is then solved at known angles of $\theta$, curves such as shown in FIG. 5 are obtained. Using the curves of FIG. 5 the capillary length to diameter ratio L/D may be determined by measuring intensity ratio $I_\theta /I_0$ at a fixed angle, such as 25°. For example, an intensity ratio of 0.6 at a tilt angle of 25° yields a length to diameter ratio of 0.5. Multiplication of L/D by nominal capillary diameter, or by diameter as determined from the previously described square root relationship of $I_0$ and D, gives capillary length L.

Although the apparatus of the prior art is particularly adapted to determine the length and diameter of capillaries having a circular cross-section, it is not to be regarded as limited thereto in any way. This invention can be used to measure the length and diameter equivalent of capillaries that are non-circular in cross-section, such as square, rectangular or triangular. Diameter equivalent is defined as the diameter of the circle whose cross-sectional area is equal to that of the capillary being measured, whatever its geometrical shape may be. In this disclosure and claims the word "diameter" is defined to mean the diameter of a circular cross-sectional hole or the diameter equivalent of holes of other cross-sections. As will be readily appreciated by one skilled in the art the equations of FIG. 4 and FIG. 21 are valid only for a circular capillary. Consequently, if a capillary with a non-circular cross-section is to be measured, the appropriate mathematics must be developed and used in place of the equation of FIG. 4. Although capillaries of unsymmetrical cross-section can be measured using the apparatus of the prior art, preferably the capillary has a symmetrical cross-section about an axis perpendicular to the hole since the mathematics is typically simplified using symmetrical capillaries.

In the apparatus of the prior art it is desirable for both the axial and angular beams to be larger in cross-sectional area than the capillary to be measured, and it is also desirable for the axial and angular beams to fully "cover" the capillary as in FIGS. 2 and 3 so that the outer portion of the beams fall incident on the area of the spinneret around the capillary. It is desirable for the beams to be larger than the capillary and fully cover the capillary because the mathematics is simplified.

Although it is desirable for the beams to be larger than the capillary, it is fully within the scope of prior art for the width of the beams to be smaller than the width of the capillary. As an example, the axial beam can be rectangular in cross section and be positioned so that the long axis of the rectangle is greater than the diameter of the capillary and the short axis of the rectangle is smaller than the diameter of the capillary. The angular beam can be the same size as the axial beam and, because the long axis of the angular beam spans the capillary, only a portion of the angular beam will pass through the capillary. Of course, in this situation the equation of FIG. 4 is no longer valid and a new correlation describing this situation can be developed by one skilled in the art.

Although it is desirable for the beams to fully cover the capillary, it is fully within the scope of this invention for the beams to be positioned so that the edge of the beams falls across the capillary. For example, the beams can be circular in cross section and the edge of the beams can fall inside the capillary. As in the above case where the beams can be smaller than the capillary, the equation of FIG. 4 is no longer valid if the edge of the beams falls across the capillary and a new correlation can be developed by one skilled in the art.

The electromagnetic beam used in the apparatus of the prior art can be of either visible or invisible character. For example, an X-ray beam can be used. Of course, the manner in which the beam is positioned upon the capillary would vary depending on the character of the beam since different frequency beams require different focusing techniques. In a preferred embodiment the beam is a visible beam, such as a laser beam which has a substantially uniform energy distribution across the beam and is composed of substantially parallel rays.

According to this invention the quantity of energy in the portion of the electromagnetic beam passed through the capillary is sensed and a signal reflective of the magnitude of the sensed quantity of energy is generated. The quantity of energy in the electromagnetic beams is sensed by photoelectrically converting the electromagnetic energy into an electrical signal. The signal generated by sensing the quantity of energy is an electrical signal having a voltage reflective of the magnitude of the sensed quantity of energy.

In FIG. 6 an axial beam 601, parallel to the axis of the capillary, is directed through the capillary to produce the value $I_0$. Simultaneously, an angular beam 602 is directed through the same capillary, at an angle $\theta$ with regard to the axis of the capillary, so as to produce the value $I_\theta$.

Figure 7:
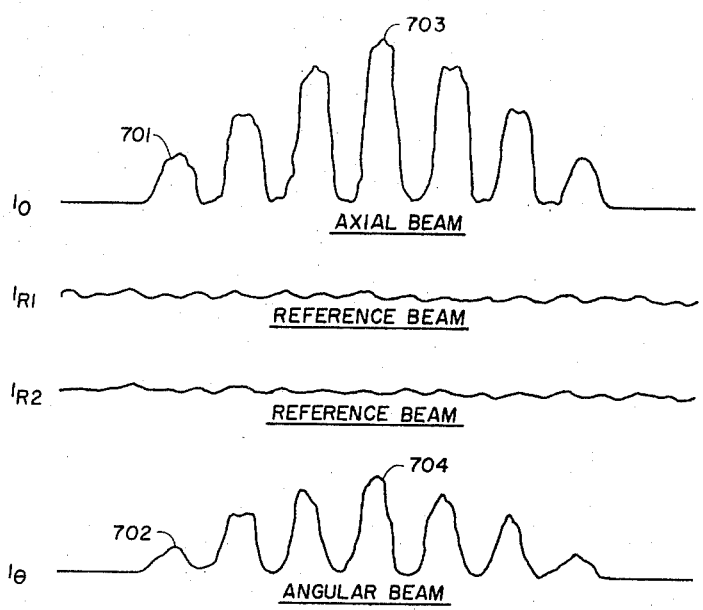
FIG. 7 is a schematic representation of the axial beam, reference beam, and angular beam voltage signals.
Figure 10:
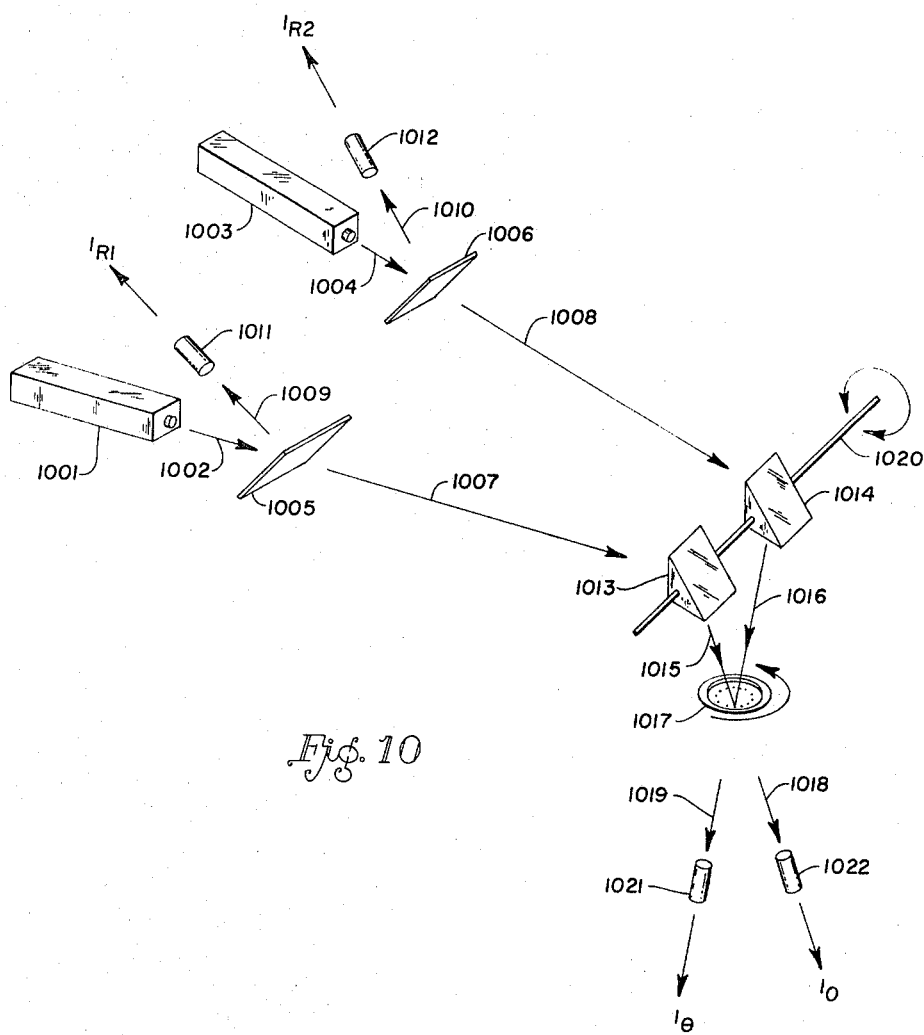
FIG. 10 is a schematic isometric illustration of the prior art device.

In FIG. 7 there is shown a graphical representation of the output voltages $I_R$, $I_0$, and $I_\theta$ as the spinneret rotates so as to convey a capillary through seven consecutive sweeps of beams 1015 and 1016 in FIG. 10. As spinneret 1017 in FIG. 10 rotates from a position where no portion of beams 1015 and 1016 fall on the capillary, to a position where a small portion of beams 1015 and 1016 pass through the capillary, there is created an initial voltage oscillation 701 from axial beam $I_0$ 1015 and an initial voltage oscillation 702 from angular beam $I_\theta$ 1016 which corresponds in time to oscillation 701 but is of smaller amplitude. As spinneret 1017 continues to rotate while beams 1015 and 1016 are radially oscillating, a greater quantity of beams 1015 and 1016 passes through the capillary until peak oscillations, 703 and 704 occur as the center of beams 1015 and 1016 fall coincident to the center of the capillary. Subsequent rotation of the spinneret produces decreasing voltage oscillations corresponding in character to the previously described increasing voltage oscillation. The ragged nonuniform character of signals $I_0$, $I_\theta$ and $I_R$ are caused by short term variations in the power output of the laser beams. The wave forms $I_0$, $I_\theta$ and $I_R$ illustrated in FIG. 7 are then introduced into the electronic circuitry illustrated in FIG. 11.

Referring again to FIG. 10 there is illustrated means 1001 generating laser beam 1402 and a similar means 1003 generating laser beam 1004 which is disposed 25° with respect to beam 1002. In the embodiment of FIG. 10, means 1001 and 1003 comprise a Model 133 1.0 mw helium neon laser manufactured by Spectra-Physics, Inc. Other means to generate a laser beam can be used within the scope of this invention.

To help compensate for the polarization effect the laser can be equipped with a magnetic polarization device such as the Option 01 arrangement for the Spectra-Physics laser. This device provides polarization of the beams to within one part in twenty.

Beams 1002 and 1004 are then directed against optical flat glass plates 1005 and 1006. Plates 1005 and 1006 allow a large percentage 1007 and 1008 of beams 1002 and 1004 to pass through the plate and reflect reference beams 1009 and 1010, which are small percentage of beams 1002 and 1004, onto means 1011 and 1012 which sense the energy of beams 1009 and 1010 and generate reference beam voltage signals $I_{R1}$ and $I_{R2}$ which are reflective of the magnitude of the sensed energy and are relatively constant and are illustrated in FIG. 7. In the embodiment of FIG. 10, reference beams 1009 and 1010 can be reflected at an angle of 8° from the perpendicular so as to reduce their polarization and help compensate for the above described polarization effect. In the embodiment of FIG. 10, means 1011 and 1012 comprise silicon photovoltaic power meter sensors Model 401B manufactured by Spectra-Physics, Inc. Other means to sense the energy of the beams and generate a voltage signal reflective of the magnitude of the sensed energy can be used. As in the case of the second embodiment, reference beam signals $I_{R1}$ and $I_{R2}$ provide continuous monitoring of the power output of the light beams.

Continuing with the prior art apparatus illustrated in FIG. 10, beams 1007 and 1008 have a selected angular separation in the horizontal plane, for example 25°, and are then reflected from two prisms 1013 and 1014 to form coplaner beams 1015 and 1016 which, although in a different plane, are also separated by the same angular separation as were beams 1007 and 1008. In a manner which is similar to the second embodiment, beams 1015 and 1016 reside in a vertical plane substantially perpendicular to the face of spinneret 1017 and are positioned at a distance from spinneret 1017 so that beams 1015 and 1016 cross at a capillary as illustrated in FIG. 10. Beam 1015 is parallel to the axis of the capillary and can be thought of as an axial beam, such as beam 601 as illustrated in FIG. 6. Beam 1016 is rotated from the paralleled position to the selected angle and can be thought of as an angular beam, such as beam 602 as illustrated in FIG. 6. The energy of the portion 1018 of axial beam 1015 that passes through the capillary is the value $I_0$ and the energy of the portion 1019 of angular beam 1016 that passes through the capillary is the value $I_\theta$.

Figure 14:
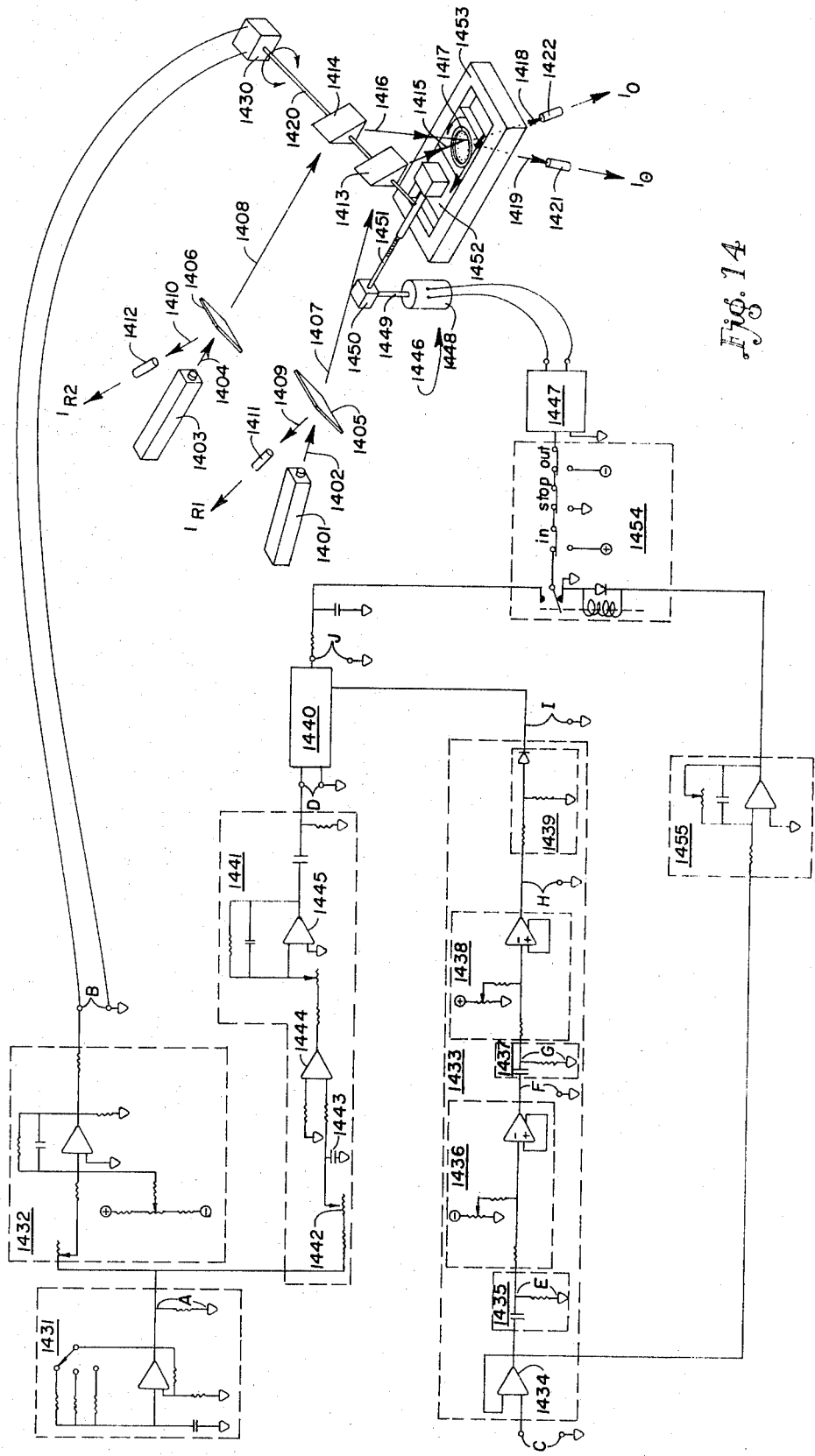
FIG. 14 is a schematic illustration of the prior art device illustrated in FIG. 10 together with an illustration of both the electrical circuitry and mechanical means of the instant invention.

Prisms 1013 and 1014 are mounted on cylindrical shaft 1020 for oscillatory movement about the axis of the shaft by suitable conventional means illustrated as means 1430 in FIG. 14.

Spinneret 1017 is rotationally mounted in a suitable conventional means which rotates the spinneret at a rate that is slow compared to the rate of oscillation of shaft 1020. The slow rate of rotation of spinneret 1017 provides a plurality of sweeps through each capillary as the spinneret rotates. Although the rate of rotation of the spinneret compared to the rate of oscillation of the sweep of the beams can vary widely with the desires and needs of the user, in one embodiment the spinneret is rotated at a speed in the range of 0.1 to 10 revolutions per minute and the beams are oscillated at a rate in the range of 10 to 1000 hertz. The amplitude of oscillation of the beams can vary widely depending on the particular circumstances but can be about 3 mm in length in one embodiment.

Oscillation of shaft 1020 causes beams 1015 and 1016 to sweep in the radial direction across the spinneret face thereby sweeping the beams across the spinneret capillary as the spinneret rotates. The combination of the radial oscillation of the beams and the spinneret rotation provide numerous consecutive passages of the beams through each capillary. Although the number of beam sweeps can vary widely, in one embodiment seven consecutive passages, or even three or less, can be used, while in the other embodiments as many as 30 consecutive passages, or even more, can be used. The combination of the beam sweep and spinneret rotation assure passage of the central maximum from axial beam 1415 and angular beam 1016 through the capillary without the need for precise manual centering.

Still referring to the embodiment of FIG. 10, below spinneret 1017, and in line with the approximate beam axes of axial beam 1015 and angular beam 1016, are placed means 1021 and 1022 which sense the energy of beams 1018 and 1019 passing through the capillary and generate voltage singals $I_0$ and $I_\theta$ which are reflective of the magnitude of the sensed energy and are illustrated in FIG. 7. In the embodiment of the invention illustrated in FIG. 10, means 1021 and 1022 can comprise silicon photovoltaic power meter sensors, Model 401B manufactured by SpectraPhysics, Inc. Other means to sense the energy of the beams and generate a voltage signal reflective of the magnitude of the sensed energy can be used within the scope of this invention.

Because beams 1015 and 1016 are radially oscillating along radii of the circle defined by the center of the orifices of spinneret 1017, and further because spinneret 1017 is rotating, the quantity of beams 1015 and 1016 that pass through spinneret 1017 is oscillatory in character with the amplitude of oscillation increasing as the spinneret rotates so as to convey a capillary into the sweep of the beams. The oscillations reach a maximum when the center of beams 1015 and 1016 are coincident with the center of a capillary, and the osciallation subsequently decreases to zero when the capillary rotates past the sweep of the beams and none of the light from beams 1015 and 1016 pass through the capillary. The graphical representation of the output voltages $I_0$, $I_\theta$, $I_{R1}$ and $I_{R2}$ are illustrated in FIG. 7. The voltage outputs $I_0$, $I_\theta$, $I_{R1}$ and $I_{R2}$ are then introduced into the functionally described circuitry illustrated in FIG. 11.

Figure 11:
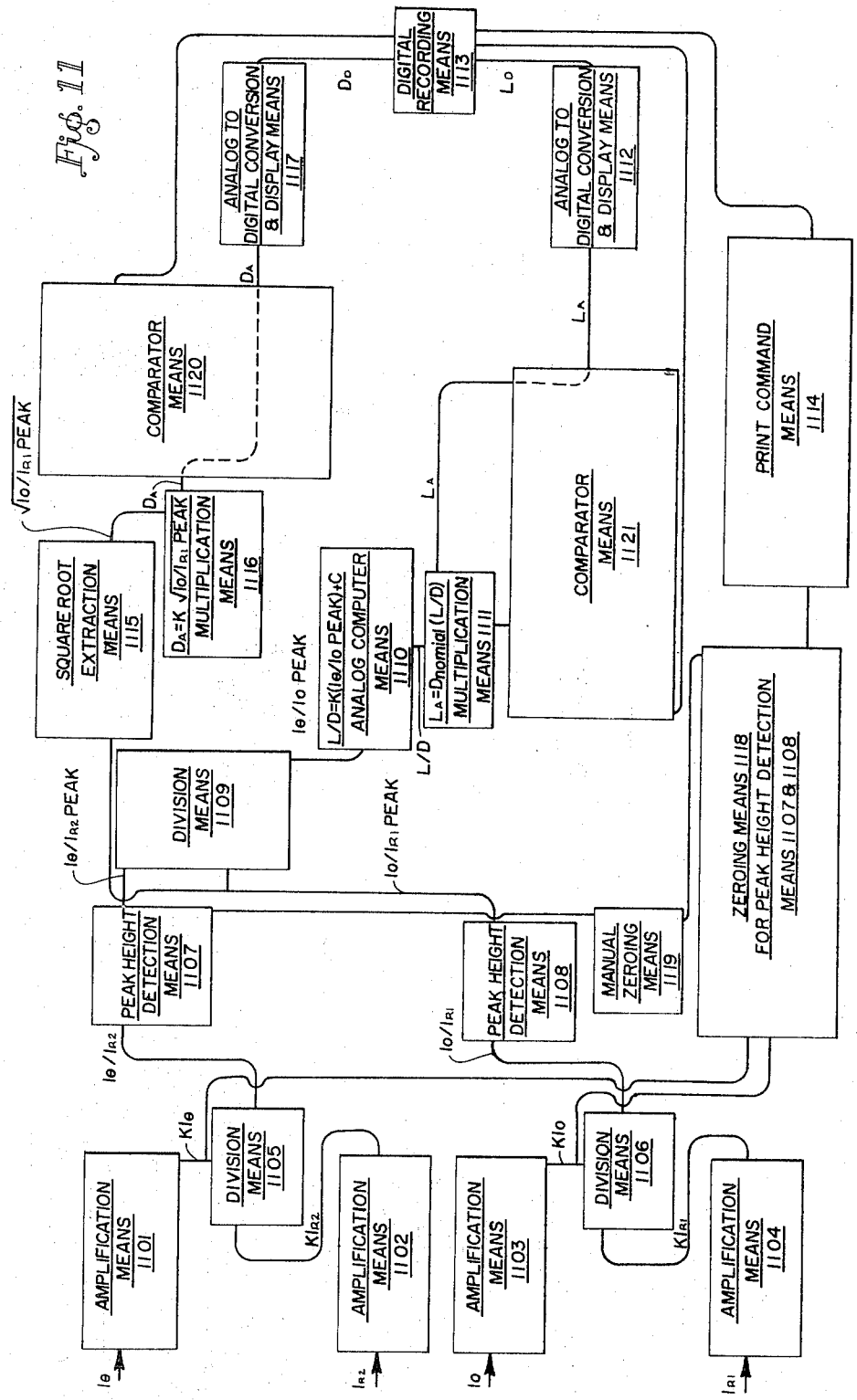
FIG. 11 is a schematic functional representation of the electronic circuitry of the prior art that determines the capillary length and diameter by solving the equation of FIG. 4 using as the input the voltage signals $I_0$, $I_\theta$, $I_{R1}$ and $I_{R2}$ which are the outputs of the apparatus of FIG. 10.

In FIG. 11 voltage outputs $I_0$, $i_\theta$, $I_{R1}$ and $I_{R2}$ are introduced into amplification means 1101, 1102, 1103 and 1104 to bring the voltage levels to a workable amplutide $KI_0$, $KI_\theta$, $KI_{R1}$ and $KI_{R2}$. These signals are then fed through division means 1105 and 1106 which ratio the angular signal with one reference signal and the axial signal with the other reference signal to give signals $I_0/I_{R1}$ and $I_\theta/I_{R2}$, illustrated in FIG. 8. The signals $I_0$ and $I_\theta$ are divided by $I_{R1}$ and $I_{R2}$ so as to compensate for the previously noted long and short term variations in the power of light beams 1002 and 1004, which cause the signals $I_0$, $I_\theta$, $I_{R1}$ and $I_{R2}$ to be ragged as illustrated in FIG. 7. Thus, the wave forms for the signals $I_0/I_{R1}$ and $I_\theta/I_{R2}$ are very smooth as illustrated in FIG. 8.

Referring back to FIG. 11, signals $I_0/I_{R1}$ and $I_\theta/I_{R2}$ are then introduced into peak height detection means 1107 and 1108. These detection means detect and store the highest amplitude of each signal in a manner analogous to the second embodiment and produce signals $I_0/I_{R1}$ Peak and $I_\theta/I_{R2}$ Peak. The peak height signals $I_0/I_{R1}$ Peak and $I_\theta/I_{R2}$ Peak are then introduced into division means 1109 which divides the signal $I_\theta/I_{R2}$ Peak by the signal $I_0/I_{R1}$ Peak and yields the ratio $I_\theta/I_0$ Peak.

The signal $I_\theta/I_0$ Peak is introduced into analogue computer means 1110 which analogizes a $y = ax + b$ or $L/D = K(I_\theta/I_0) + C$ or $L/D = -1.898(I_\theta/I_0) + 1.716$ linear approximation of the curve in FIG. 5 for the selected angle and analogue computer means 1110 solves for the value of L/D. The value L/D is then introduced into multiplier means 1111 and the value L/D is multiplied by the nominal diameter of the capillary, $D_{nominal}$, to provide an analogue signal, $L_A$, reflective of the length of the capillary. The analogue signal $L$, is then introduced into analog to digital conversion and display means 1112 wherein the analog signal $L_A$ is converted to a digital signal, $L_D$. The digital signal $L_D$ is visually displayed and conducted to digital recording means 1113 wherein the digital signal $L_D$ is recorded.

Describing now the determination of the value D, reference is again made to FIG. 11 wherein the signal $I_0/I_{R1}$ Peak from peak height detection means 1108 is introduced into square root extraction means 1115 which extracts the square root of $I_0I_R$ Peak. The signal $\sqrt{I_0/I_{R1}}$ Peak is then introduced into multiplication means 1116 and multiplied by an appropriate value of K to provide an analogue signal, $D_A$, reflective of the capillary diameter D. The analogue signal $D_A$ is then introduced into analogue to digital conversion means 1117 wherein the analogue signal $D_A$ is converted to a digital signal, $D_D$. The digital signal $D_D$ is visually displayed in means 1117 and conducted to digital recording means 1113 wherein the digital signal $D_D$ is recorded. Thus, digital recording means 1113 has recorded both the determined diameter and length of each spinneret. A typical print-out of these data is illustrated in FIG. 13.

A zeroing function can be applied to peak height detection means 1107 and 1108 since these means sense and retain the highest amplitude of the oscillating voltages applied and the retained voltage $I_0/I_{R1}$ Peak and $I_\theta/I_{R2}$ Peak must be reduced to zero voltage before the next succeeding capillary can be measured. In order to accomplish this zeroing function the apparatus of FIG. 11 can incorporate zeroing means 1118 for peak height detection means 1107 and 1108. Zeroing means 1118 functions by sensing the absence of a signal $KI_\theta$ and $KI_0$ from amplification means 1101 and 1103 when spinneret 1017 rotates so as to entirely remove the recently measured capillary from the sweep of beams 1015 and 1016. Responsive to the absence of thse signals, zeroing means 1118 generates a zeroing signal which is conducted to peak height detection means 1107 and 1108 thereby causing the voltage $I_\theta/I_{R2}$ Peak and $I_0/I_{R1}$ Peak to decay to zero. Peak height detection means 1107 and 1108 are then ready to sense and retain the amplitude of the oscillating increasing voltages $I_0/I_{R1}$ and $I_\theta/I_{R2}$ when the rotation of spinneret 1017 positions the next succeeding capillary to be measured within the sweep of beam 1015 and 1016.

Zeroing means 1118 provides an automatic zeroing function but optionally manual zeroing means 1019 can be utilized to perform the zeroing function upon manual actuation.

To eliminate the need for manual activation of the recorder each time the $D_D$ and $L_D$ are conducted to the printer, a print command means 1014 can be employed to trigger a print cycle after the passage of a capillary through the sweeping beams.

In another aspect (not shown) of this apparatus the signal $D_A$ generated by multiplication means 1116 can be conducted to multiplication means 1111 and the value $L_A$ can then be determined by multiplying L/D by $D_A$ instead of $D_{nominal}$. Although the use of the $D_A$ value instead of $D_{nominal}$ value gives greater accuracy, the use of the $D_{nominal}$ value gives results which are entirely satisfactory for many applications.

During measurement of the capillaries of a spinneret using this prior art apparatus an operator observes the visual and recorded display of capillary length and diameter data. After mentally applying a certain tolerance, the operator can determine both the individual capillaries having diameters or lengths out of tolerance, as well as the total number of capillaries having diameters or lengths out of tolerance, and thereby the operator can identify a defective spinneret. If the diameter and length data is being generated fairly slowly a skilled operator can identify defective spinnerets by observing the presented diameter and length data, mentally applying tolerances and determining the total number of diameters and lengths out of tolerance. However, if it is desired to measure the capillaries of a spinneret rapidly the large volume of length and diameter data presented to the operator in a short time exceeds his ability to perform the metal steps required to indentify a defective spinneret. For instance, if 30 capillaries are measured in one minute this generates 60 data outputs representing the length and diameter of each capillary. Even a highly skilled operator could not typically perform the mental steps required to identify and total the number of out-of-tolerance data points.

For rapid measurement analogue comparators 1520 and 1521 can be used. When fed the appropriate nominal voltage values and tolerance limits for the diameter and length of the capillaries, the comparators electrically compare the analogue values with maximum and minimum values and provide a "go/no-go" output to indicate whether each determined length or diameter is within tolerance. The comparator outputs can be interfaced to digital recording means 1113 in such a manner that a signal character, such as the letter $n$, appears in the printed column to the immediate left of any out-of-tolerance measurement as illustrated in FIG. 13. In the embodiment of FIG. 11 comparators 1120 and 1121 can comprise a Model 4021/25 comparator manufactured by the Burr-Brown Corporation. Although this technique for identification of out-of-tolerance diameters and lengths considerably simplifies the problem of the operator having to mentally apply a tolerance to identify defective spinnerets, if it is desired to rapidly average the data, compute statistical parameters, or automatically calibrate the apparatus, a digital computer, such as the PDP-8/E-BA minicomputer manufactured by the Digital Equipment Corporation, can be used.

Figure 12:
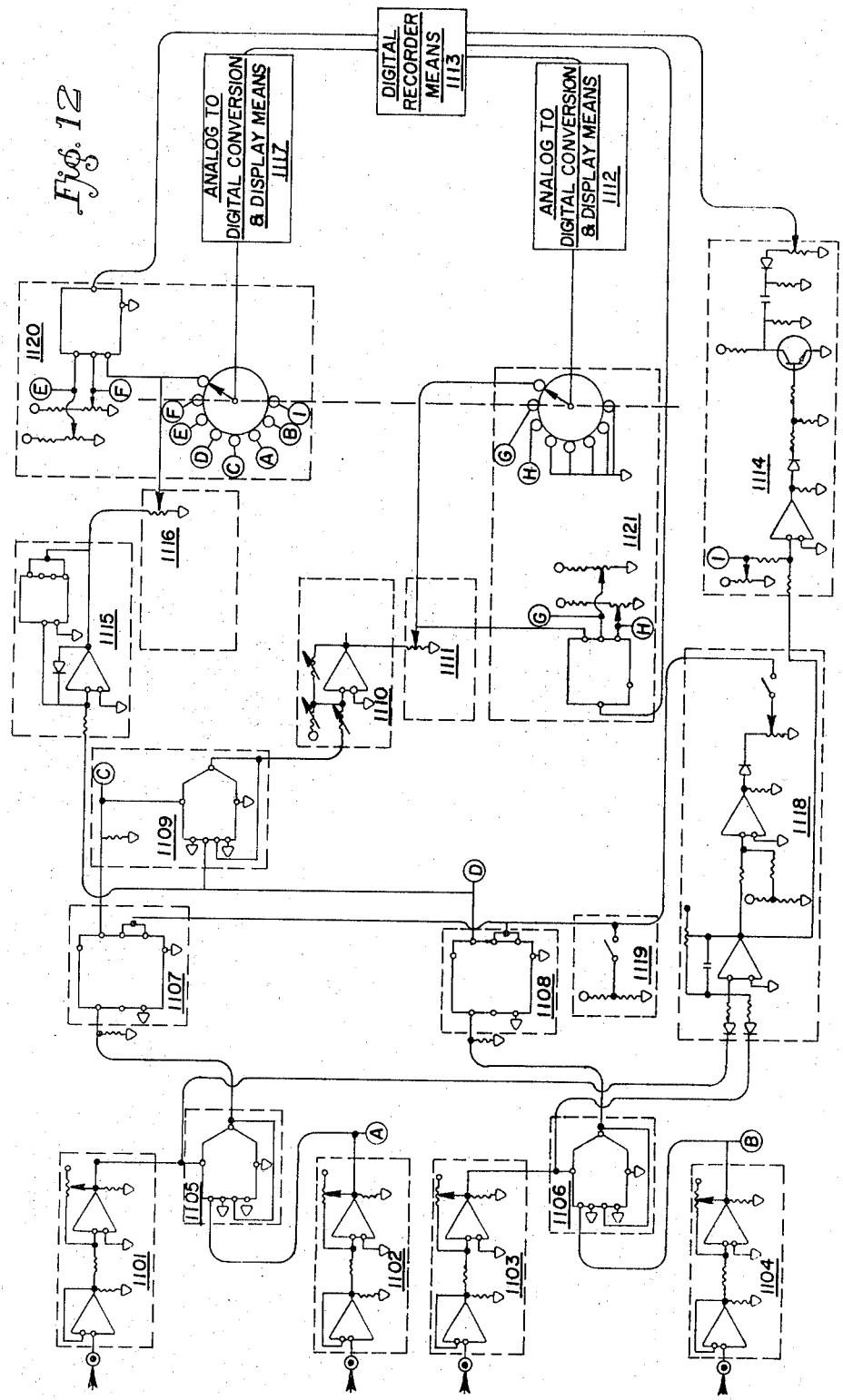
FIG. 12 is one specific embodiment of the circuitry described functionally in FIG. 11.

Referring now to FIG. 12 there is illustrated on specific embodiment of the functional circuitry shown in FIG. 11. It will be recognized that other specific embodiments of the functional circuitry of FIG. 11 can be used within the scope of this invention.

In FIG. 12 one embodiment of amplification means 1101, 1102, 1103 and 1104 comprise serially operated Model 3129/15 amplifiers manufactured by the Burr-Brown Corporation. Other circuitry well known in the art can be used to provide the amplification function of amplification means 1101, 1102, 1103 and 1104.

The output signals from amplification means 1101, 1102, 1103 and 1104 are conducted to division means 1105 and 1106 which in the specific embodiment of FIG. 12 comprise a Model 4098/25 divider manufactured by Burr-Brown Corporation. Other division circuitry well known in the art can be used in place of the above described division means.

The signals $I_0/I_{R1}$, $I_\theta/I_{R2}$ coming from division means 1105 and 1106 are conducted through peak height detection means 1107 and 1108. In the embodiment of FIG. 12 peak height detection means 1107 and 1108 comprise a Model 4084/25 peak height detecting module manufactured by the Burr-Brown Corporation.

The output signals from peak height detection means 1107 and 1108 are then conducted to division means 1109 which in the embodiment of FIG. 12 comprises a Model 4096/15 divider manufactured by the Burr- Brown Corporation. Other conventional dividing circuitry could be used within the scope of this invention.

The output signal $I_\theta/I_0$ Peak from division means 1109 is then conducted to analog computer means 1110. In the specific embodiment of FIG. 12 analog computer means 1110 comprises a Model 3020/15 amplifier manufactured by the Burr-Brown Corporation which multiplies the signal $I_\theta/I_0$ Peak by the value K and the value C is then added through a variable resistor to form the value $K(I_\theta/I_0\text{ Peak}) + C$ which is the value L/D.

The value of L/D is then conducted to multiplication means 1111 and in the specific embodiment of FIG. 12 a variable resistor is used to produce the signal $L_A$ by multiplying the signal by the value $D_{nominal}$. If it is desired to multiply the L/D value by $D_A$ then suitable conventional circuitry can be used in place of the variable resistor. Other circuitry well known in the art could be used in multiplication means 1111.

The signal $L_A$ generated by multiplication means 1111 is then conducted to analog to digital conversion and display means 1112 which in the embodiment of FIG. 12 comprises a Datascan Model 520-V3 digital panel meter manufactured by Datascan Corporation. In this embodiment of means 1112 the analog signal $L_A$ is converted to a digital signal and the digital signal is displayed for visual observation.

The digital signal is then conducted to digital recorder means 1113 which in the specific embodiment of FIG. 12 comprises a Hewlett-Packard Model 5055A Digital Recorder. This instrument is particularly suitable since it has a 10 column capacity, 10 lines per second writing speed, and generates an internal "inhibit" signal to maintain a constant value from the data source during the print cycle.

In the specific embodiment of FIG. 12 print command means 1114 can comprise an arrangement including a Model 3020/15 amplifier manufactured by the Burr-Brown Corporation having one input attached to the sliding integrator of zeroing means 1118. By establishing an appropriate bias level on the comparator operating in conjunction with the analogue to digital conversion and display means the print cycle was activated just prior to the zeroing of the peak height detectors, thus assuring that only relevant data would be printed.

In the embodiment of the invention of FIG. 12 zeroing means 1118 comprises diodes operating in conjunction with a Model 3020/15 amplifier manufactured by the Burr-Brown Corporation which is operating with an arrangement of a capacitor and variable resistor across the amplifier. The output from this amplifier is attached to the input to a Model 3020/15 amplifier manufactured by the Burr-Brown Corporation. The output from this amplifier is attached to a diode and variable resistor which are attached through a suitable switch to the zeroing input of peak height detection means 1107 and 1108. Other conventional circuitry could be used as the zeroing means.

Still referring to FIG. 12 manual zeroing means 1119 comprises in this embodiment a switch upon which a constant voltage is impressed. Other circuitry well known in the arm could be used as zeroing means 1119.

In the specific embodiment of FIG. 12 comparator means 1120 and 1121 can comprise a Model 4021/25 window comparator manufactured by the Burr-Brown Corporation.

Still referring to FIG. 12, the signal $I_0/I_{R1}$ Peak generated by peak height detection means 1108 is conducted to square root extraction means 1115 which in the embodiment of FIG. 16 comprises the combination of a Model 3020/15 amplifier manufactured by the Burr-Brown Corporation operating in conjunction with a Model 9874/19 Squaring Module manufactured by the Burr-Brown Corporation. Other conventional square root extracting circuitry could be used if desired.

The signal $\sqrt{I_0/I_{R1}}$ Peak generated by square root extraction means 1115 is then conducted to multiplication means 1116 wherein the value $D_A$, which is the analogue value reflective of the diameter of the capillary, is computed by a variable resistor which multiplies an appropriate value of K by the value $\sqrt{I_0/I_{R1}}$ Peak. Other multiplication circuitry of conventional design can be used if desired.

The signal $D_A$ which is the analogue expression of the diameter of the capillary is then conducted to analogue to digital conversion and display means 1117, which in the embodiment of FIG. 12 is identical to means 1112. As in the case of means 1112, means 1117 is interfaced to digital recorder means 1113.

In developing the equation of FIG. 4 it was assumed that a perfectly uniform power distribution exists across the light beam, that the capillary is an ideal right circular cylinder, that the capillary walls have an absorptance coefficient of 1.0, and that no diffraction effects exists. If desired, these factors can be incorporated into the equation of FIG. 4 and the straight line approximation of the curve for any selected angle will be altered accordingly. In another approach, the equation developed using the above described assumptions, which is $$L/D = 1.90(I_{25}/I_0) + 1.72$$

can be empirically altered on the basis of correlation of length and diameter data generated by the invention with length and diameter data obtained from use of the scanning electron microscope to the form $$L/D = 2.53(I_{25}/I_0) + 2.30.$$

THE INVENTION

This invention relates to control of the previously described prior art device so as to position the axis of the capillary coincident with the axis of the first laser beam by translating the rotating spinneret along the radius of the spinneret. Radial translation of the rotating spinneret is accomplished by the steps of generating a periodic sampling signal having a sampling period of predetermined duration, the sampling period corresponding in time to the maximum amplitude of the electrical signal representing the quantity of energy sensed in the portion of the first laser beam that passes through teh capillary, sensing the value of the voltage of the periodic signal driving the galvanometer during the sampling period of the periodic sampling signal, generating an error signal reflective of the magnitude of the sensed voltage of the periodic signal during the sampling period of the periodic sampling signal, and radially translating the rotating spinneret at a rate reflective of the magnitude of the error signal.

In manufacturing spinnerets a spinneret "blank" is prepared and the capillaries are then formed in the blank. An attempt is made to form the capillaries in a configuration so that the centers of the capillaries define a circle having a center coincident with the center of the spinneret. Thus, ideally each capillary is precisely the same distance from the center of the spinneret. In actuality, manufacturing limitations result in the capillaries not being precisely equidistant from the center of the spinneret because either the capillaries are not exactly in a circle, or the circle defined by the center of the capillaries is not exactly coincident with the center of the spinneret, or a combination of the two. Since the above described prior art devices operates by rotating the spinneret to sequentially position each capillary under the sweeping beams, manually "zeroing" the axis of the axial beam to be coincident with the axis of one capillary does not insure that the axis of the axial beam will be coincident with the axes of other capillaries sequentially positioned under the sweeping beams by the rotation of the spinneret. To phrase the problem in a different manner, even though one capillary can be zeroed so that the axial beam "looks" straight down into the capillary, the axial beam may not look straight down on the next capillary because the next capillary may not be the same distance from the center of the spinneret as was te capillary on which the axial beam was zeroed.

Although the above described prior art device is entirely satisfactory for many applications, some error is introduced when the axial beam does not look directly down on the capillary so that the axis of the angular beam is not coincident with the axis of the capillary. Since the angle between the axis of the axial beam and the axis of the capillary will vary from capillary to capillary, a different error can be produced in measuring each capillary of a plurality of capillaries. This error could be eliminated if the axial beam could be caused to always look straight down on each capillary.

I have now invented a controller for the prior art device that positions each capillary to be sequentially measured so that the axis of the axial beam falls coincident with the axis of the capillary and the axial beam looks straight down on each capillary. Thus, according to my invention, the maximum amount of the axial beam passes through the capillary when the axis of the capillary and the axis of the axial beam are coincident. Each capillary is positioned in this location by translating the rotating spinneret along the radius of the rotating spinneret. Thus, the controller compensates for a capillary being inside or outside the circle wherein the capillaries theoretically reside.

More specifically my invention can be described as an apparatus and method which operated by A. generating a first periodic signal having a voltage directly proportional to time;
B. responsive to the first periodic signal, periodically optically radially oscillating the first and second measurement laser beams across the circle defined by the centers of the plurality of orifices so as to position the first measurement laser beam at an angle with regard to the axia of the capillary that is proportional to the value of the voltage of the first periodic signal;
C. generating a periodic sampling signal having a sampling period of predetermined duration, the sampling period corresponding in time to the maximum amplitude of the third electrical signal of the previously described prior art device;
D. sensing the value of the voltage of the first periodic signal during the sampling period of the periodic sampling signal;
E. generating an error signal reflective of the magnitude of the sensed voltage of the first periodic signal during the sampling period of the periodic sampling signal, and
F. radially translating the rotating spinneret at a rate reflective of the magnitude of the error signal.

In another more specific embodiment my invention can be thought of as an apparatus and method which operates by A. generating a first periodic signal having a square wave voltage;
B. integrating the square wave voltage of the first periodic signal to form a second periodic signal having a voltage directly proportional to time;
C. responsive to the second periodic signal, periodically optically radially oscillating the first and second measurement laser beams across the circle defined by the centers of the plurality of orifices so as to position the first measurment laser beam at an angle with regard to the axis of the capillary that is proportional to the value of the voltage of the second periodic signal;
D. generating a delayed second periodic signal having a voltage directly proportional to time and having a zero voltage correlated in time with a zero angle between the first measurement laser beam and the axis of the capillary,
E. generating a periodic sampling signal having a sampling period of predetermined duration, the sampling period corresponding in time with the maximum amplitude of the third electrical signal of the previously described prior art device;
F. sensing the value of the voltage of the delayed second periodic signal during the sampling period of the periodic sampling signal;
G. generating a constant voltage error signal having a magnitude reflective of the magnitude of the sensed value of the voltage of the delayed second periodic signal during the sampling period of the periodic sampling signal; and
H. radially translating the rotating spinneret at a rate reflective of the magnitude of the voltage of the constant voltage error signal.

In one still more specific embodiment the periodic sampling signal is generated by 1. forming a first differentiated signal by differentiating the third electrical signal of the previously described prior art device;
2. forming a first inverted square wave signal having an inverted voltage square wave, the wave having a sampling portion corresponding in time duration to the positive portion of the first differentiated signal;
3. forming a second differentiated signal by differentiating the first square wave signal;
4. forming a second inverted square wave signal having an inverted voltage square wave, the wave having a positive sampling portion corresponding in time duration to the negative portion of the second differentiated signal and having negative sampling portion corresponding in time duration to the positive portion of the second differentiated signal, and
5. forming the periodic sampling signal by eliminating the negative sampling portion of the second inverted square wave signal.

Figure 15:
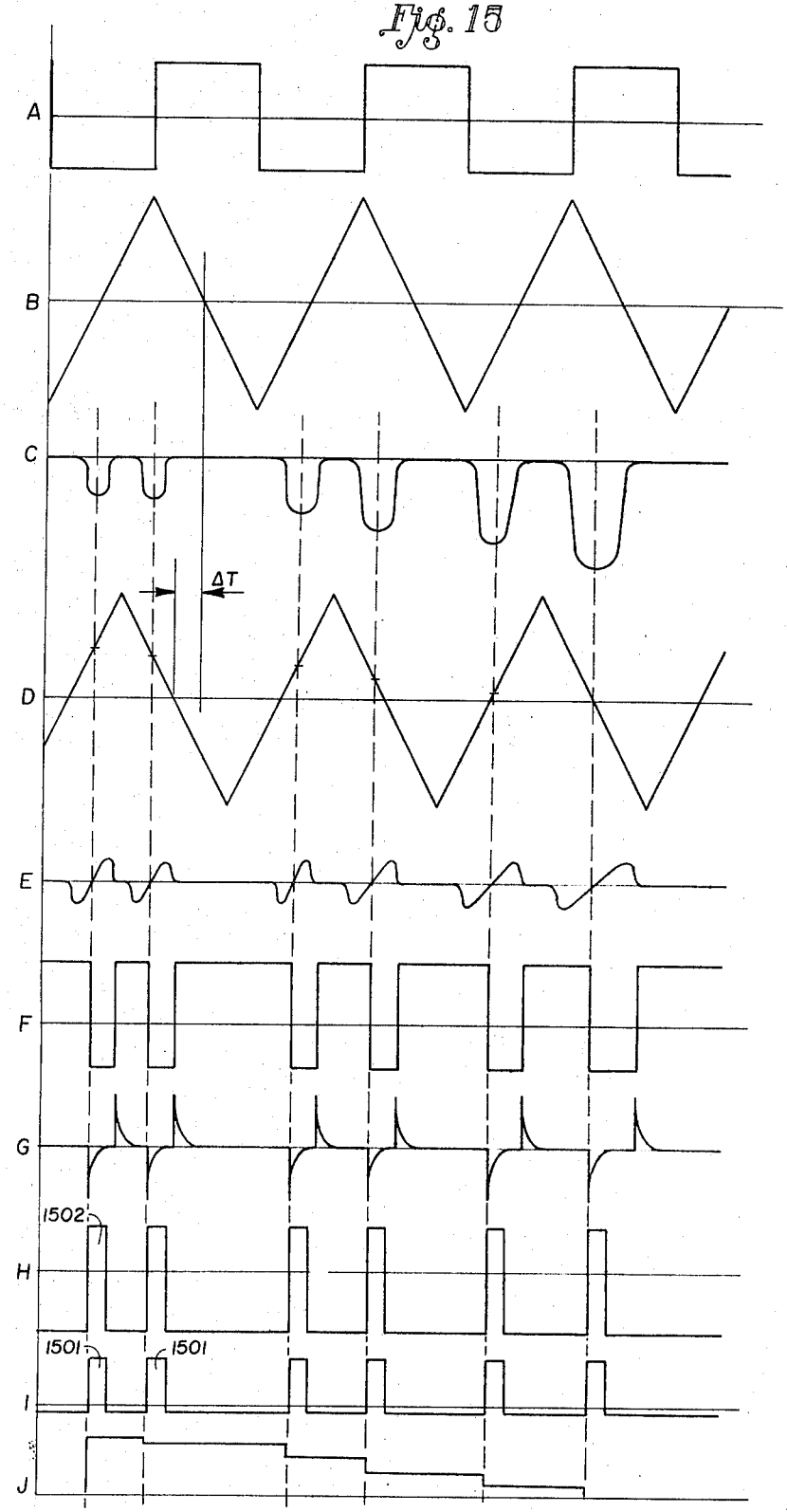
FIG. 15 illustrates the various wave forms involved in the functioning of the electronic circuitry in FIG. 14.

An understanding of my invention can be readily achieved by considering the attached FIGS. 14 and 15, which represent only one particular embodiment of the invention.

FIG. 14 comprises a schematic isometric illustration of the same prior art device illustrated in FIG. 10 together with an illustration of both the electrical circuitry and mechanical means of the instant invention. In FIG. 14 the last two numbers of the numerical designation of the prior art device correlate with the last two numbers of the numerical designations of the same prior art device illustrated in FIG. 10.

FIG. 15 illustrates the various wave forms involved in the functioning of the electronic circuitry in FIG. 14.

Describing now the operation of the instant invention while referring to both FIGS. 14 and 15, galvanometer 1430 is driven by wave form B, which is a periodic signal having a voltage directly proportional to time. Responsive to wave form B, galvanometer 1430 oscillates shaft 1420 so as to position shaft 1420 at an angle that is proportional to the value of the driving voltage. Thus, galvanometer 1430 periodically optically radially oscillates the first and second measurement laser beams across the circle defined by the centers of the plurality of orifices so as to position the first measurement laser beam, or axial beam, at an angle with regard to the axis of the capillary that is proportional to the value of the voltage of the first periodic signal. When the voltage of the periodic signal is zero and shaft 1420 is not subject to any inertial or mechanical lag, shaft 1420 is positioned so that axial beam 1415 looks straight down into the capillary. At maximum voltage, the position of shaft 1420 is at a maximum angle of deflection. Galvanometer 1430 can comprise a Model G-108 galvanometer manufactured by General Scanning, Inc. driven by a Model A-100 driver amplifier (not shown) manufactured by General Scanning, Inc.

Wave form B is generated by a combination of means 1431 and 1432. Means 1431 generates a periodic signal of wave form A having a square wave voltage. Means 1432 integrates the periodic signal of wave from A to form a periodic signal of wave form B.

Means 1431 can comprise a conventional astable multivibrator which generates a square wave whose frequency is inversely proportional to the resistance in its feedback loop. In one embodiment a Burr-Brown Model 3022/15 operational amplifier, manufactured by the Burr-Brown Corporation, can be used. Although various values of resistance can be used to create the desired frequency, in one embodiment the frequencies available are 28, 84, and 169 $H_z$.

Means 1432 comprises an operational amplifier operating in conjunction with a large resistor and a small capacitor to form a sliding integrator with variable gain and DC offset, whose output, being the time integral of wave form A, is sawtooth waveform B of the same frequency. In one embodiment the operational amplifier can be a Burr-Brown Model 3022/15, manufactured by the Burr-Brown Corporation.

Since the galvanometer deflection at any instant is proportional to the instantaneous voltage of wave form B, which is linear with time, the angular sweep speed is constant except for momentary deceleration and acceleration at the end points where maximum deflection occurs. Constant sweep speed is considered important since, due to capacitive losses in connecting cables, the device is sensitive to apparent variations in signal frequency which occur when capillaries do not pass through identical positions along the width of a variable velocity sweep.

Continuing with the description of the invention, there is provided means 1433 to generate a periodic sampling signal, wave form I, having a plurality of sampling portion, 1501, of predetermined duration. Sampling period 1501 corresponds in time to the maximum amplitude of the third electrical signal of the prior art device, wave form C, which is signal $I_0/I_{R1}$ illustrated in FIG. 8. More particularly, sampling period 1501 begins in time with the maximum amplitude of the third electrical signal and terminates with the decay of wave form G, which will be subsequently described in detail.

In one specific embodiment of FIG. 14, means 1433 comprises an operational amplifier 1434 which receives the third electrical signal of the prior art device, wave form C, and acts as a buffer to prevent sudden pulses of voltage from entering the electronics. A Burr-Brown Model 3022/15 operational amplifier, manufactured by Burr-Brown Corporation, is a suitable amplifier.

Wave form C is communicated to means 1435 to form a first differentiated signal, wave form E, by differentiating the third electrical signal, which is wave form C.

In the specific embodiment of FIG. 15, means 1435 comprises a conventional RC circuit.

The first differentiated signal, wave form E, is communicated to means 1436 to form a first inverted square wave signal, wave form F, having an inverted voltage square wave. Wave form F has a plurality of sampling portions 1504 corresponding in time duration to the positive portion of the first differentiated signal, wave form E. In the specific embodiment of FIG. 14, means 1436 comprises a comparator comprised of a negative bias means and an operational amplifier, such as a Burr-Brown Model 3400A, manufactured by Burr-Brown Corporation. Means 1436 undergoes a negative-going transistion at the instant when the voltage of wave form E becomes positive. The negative bias, resulting in a positive bias imparted to wave form F, is desirable because the positive DC component of wave form F insures that the amplifier will remain positive until the positive portion of wave form E occurs.

The first inverted square wave, wave form F, is communicated to means 1437 to form a second differentiated signal, wave form G, by differentiating the first square wave signal, wave form F. In the embodiment of FIG. 14, means 1437 is a conventional RC circuit. The sharp negative spike of wave form G corresponds in time to the occurrence of the maximum voltage of wave form C and zero voltage of wave form E.

The second differentiated signal, wave form G, is communicated to means 1438 to form a second inverted square wave signal, wave form H, having an inverted voltage square wave. This wave form has a plurality of positive sampling portions 1502 corresponding in time duration to the negative portion of the second differentiated signal, wave form G. Means 1438 can comprise a positive bias and and operational amplifier, such as a Burr-Brown Model 3400A, manufactured by Burr-Brown Corporation. The positive bias, resulting in a negative bias imparted to wave form H, is desirable because the negative DC component insures that the amplifier will remain negative until the negative portion of wave form G occurs.

The second inverted square signal, wave form H, is communicated to means 1439 to form the periodic sampling signal, wave form I, by eliminating the negative sampling portion 1503 of the second inverted square wave signal, wave form H. In the embodiment of FIG. 14 means 1439 comprises a conventional diode.

Although not shown in FIGS. 14 and 15, the periodic sampling signal, wave form I, can be communicated to means 1440 to sense the value of the voltage of the periodic signal of wave form B during the sampling period 1501 of the periodic sampling signal and generate an error signal reflective of the magnitude of the sensed voltage of the periodic signal of wave form B during the sampling period 1501 of the periodic sampling signal. Means 1440 is normally in its "hold" mode except during the sampling period 1501 of the periodic sampling signal, wave form I. Although other equipment can be used for means 1440, in the specific embodiment of FIG. 14, means 1440 comprises a Sample/Hold Module Model 4035/15, manufactured by Burr-Brown Corporation.

Although the input into means 1440 can be the periodic signal of wave form B used to drive galvanometer 1430, in the embodiment described in FIGS. 14 and 15 the input into means 1440 is a delayed periodic signal of wave form D having a voltage directional proportional to time. The amount of the delay is sufficient to correlate the zero voltage of the delayed periodic signal of wave form B with a zero angle between the axis of the axial beam and the axis of the capillary so that axial beam 1415 looks straight down into the capillary when the voltage of the delayed periodic signal is zero. The delay function is desirable because in some cases elastic characteristics of the coupling between shafft 1420 and galvanometer 1430, inertia of prism 1414 and 1414 and other mechanical features causes the actual deflection of shaft 1420 to "lag" behind the driving signal. Thus, to describe the situation in a slightly different manner, when the voltage of the driving signal is at zero, shaft 1420 should be positioned so that the axial beam 1415 looks straight down at the capillary. Because of the above described mechanical aspects of the device, some lag may occur and the axial beam 1415 may look straight down on the capillary at some instant before or after the voltage of the galvanometer driving signal is zero. Although judicious selection of the mechanical equipment can eliminate this problem, means 1441 can be used to perform the delay function.

In the specific embodiment of FIG. 14 the periodic signal of wave form A is communicated to means 1441 and means 1441 forms the delayed periodic signal of wave form D which is of the same frequency and amplitude as the periodic signal of wave form B but lags in time $\Delta T$. The particular $\Delta T$ is, of course, selected to reflect the particular mechanical equipment in use and would be different for other specific equipment. Thus, the particular $\Delta T$ results in the axial beam 1415 looking straight down on the capillary at precisely the instant when the voltage of the periodic signal of wave form B is zero.

In the embodiment of FIG. 14, means 1441 can comprise variable resistor 1442 operating in conjunction with capacitor 1443 to produce the selected time lag $\Delta T$ by varying the resistance of resistor 1442. The delayed signal from capacitor 1443, of wave form A but delayed $\Delta T$, is introduced through operational amplifiers 1444 and 1445.

Operational amplifier 1444 can be a Burr-Brown Model 3064/15 manufactured by Burr-Brown Corporation and operates as a noninverting comparator.

Operational amplifier 1445 can be a Burr-Brown Model 3020/15, manufactured by Burr-Brown Corporation, and operates in conjunction with a resistor and capicator to form a sliding integrator to integrate delayed wave form A into wave form wave in a manner similar to means 1432 integrating waave form A into wave form B.

The signal from the sliding integrator of operational amplifier 1445 is introduced through an RC circuit to remove any extraneous DC component present and the output signal from the RC circuit is the delayed periodic signl of wave form D.

Continuing with the description of the invention, the error signal, wave form J from means 1440, is conducted through an RC circuit to remove extraneous components, such as spikes, resulting from the switching function of means 1454. Wave form J is then conducted through a conventional switching means 1454, to be later described in detail, and then to a means shown generally as 1446 to radially translate the rotating spinneret at a rate reflective of the magnitude of the error signal.

Means 1446 comprises an amplifier 1447 which functions to provide the current gain to drive servomotor 1448. In the specific embodiment of FIG. 14, means 1447 can be a Model EM-1802 controller manufactured by Inland Controls, Inc.

The output from means 1447, which is the error signal, wave form J, is communicated to servomotor 1448, which can be a Model T-1802 Servomotor manufactured by Inland Controls, Inc. Servomotor 1448 is mechanically linked through shaft 1449, right angle gear reducer 1450 and partially threaded shaft 1451 to sliding member 1452, which accommodates rotating spinneret 1417 and is slidably mounted to frame 1453.

In operation, the error signal, wave form J, causes servomotor 1448 to rotate shaft 1449 at a rate that is proportional to the magnitude of the voltage of the error signal, wave form J, which is comprised of a series of constant voltages of decreasing value. Rotation of shaft 1449 is translated into rotation of shaft 1451 which, because its threaded section mates with a correspondingly threaded passageway in means 1452, causes means 1452 to be slidably positioned at a decreasing rate until the voltage of the error signal, wave form J, falls to zero, at which time movement of member 1452 ceases and a capillary to be measured has been radially translated so as to position the axis of the axial beam 1415 coincident with the axis of the capillary and axial beam 1415 is looking straight down into the capillary.

Describing now switching means 1454, there is provided "in", "out" and "stop" switching to manually move means 1452 to initiate the measurement of a spinneret, since the spinneret to be measured may be of different size than the last spinneret measured. Switching means 1454 also comprises a conventional relay switch receiving a signal from means 1455. Means 1455 and the relay switch of means 1454 provide a switching function to switch the servomotor into the electronics only when a pulse occurs in the third electrical signal of the prior art, wave form C. Thus, no extraneous signals can be communicated to the servomotor 1448. In the embodiment of FIG. 14, means 1455 comprises a Burr-Brown Model 3020/15 operational amplifier, manufactured by Burr-Brown Corporation, operating in conjunction with a variable resistor and capicator to form a sliding integrator.

The operation of the invention has heretofore been described only in terms of what one might call a "positive" mode, since the error signal, wave form J, has a positive character resulting from the sampling periods 1501 of wave form I occuring in time during the positive portion of wave form D. Responsive to the positive character of wave form J, servomotor 1448 drives sliding member 1452 in one direction. If the sampling periods 1501 of wave form I occur during the negative portion of wave form D, then wave form J will be negative and the invention can be thought of as operating in its "negative" mode. When wave form J is negative, servomotor 1448 drives sliding member 1452 in the opposite direction from the direction sliding member 1452 is driven in the positive mode.

The invention has been described in considerable detail with particular reference to preferred embodiments thereof, but it will be understood that variations and modifications can be effected within the spirit and scope of the invention.

I claim:

1. In a method of measuring both the length and the diameter of a capillary of an orifice in a spinneret comprising
   1. rotating about its axis a spinneret having a plurality of orifices disposed in a circle substantially concentric to the axis of the spinneret, at least a portion of each orifice defining a right cylinder capillary passageway,
   2. generating first and second laser beam, each beam having a size larger than the size of the capillary,
   3. optically dividing the first laser beam into a first reference laser beam and a first measurement laser beam,
   4. optically dividing the second laser beam into a second reference laser beam and a second measurement laser beam,
   5. optically positioning the first measurement laser beam substantially parallel to the axis of the spinneret and upon an orifice in such a manner that the beam entirely covers the orifice and a portion of the beam passes through the capillary of the orifice,
   6. optically positioning the second measurement laser beam at a predetermined angle with regard to the axis of the spinneret and upon the orifice in such a manner that the beam entirely covers the orifice and a position of the beam passes through the capillary of the orifice,
   7. optically radially oscillating the first and second measurement laser beams across the circle defined by the centers of the plurality of orifices, the radial oscillation being at a suitable rate to allow the portion of the first and second beams to substantially simultaneously pass through the capillary of the orifice on at least three consecutive oscillations,
   8. sensing the quantity and the nonuniform character of energy in a portion of the first measurement laser beam passed through the capillary of the orifice by photoelectrically converting the light energy of the portion of the beam into a first measurement electrical signal having an oscillatory voltage reflective of the magnitude and nonuniform character of the sensed energy.
   9. sensing the quantity and the nonuniform character of energy in the portion of the second measurement laser beam passed through the capillary of the orifice by photoelectrically converting the light energy of the portion of the beam into a second measurement electrical signal having an oscillatory voltage reflective of the magnitude and nonuniform character of the sensed energy,
   10. sensing the nonuniform character of the energy in the first reference laser beam and generating a first reference electrical signal having a voltage reflective of the nonuniform character of the sensed energy,
   11. sensing the nonuniform character of the energy in the portion of the second reference laser beam and generating a second reference electrical signal having a voltage reflective of the nonuniform character of the sensed energy,
   12. electrically dividing the voltage of the first measurement electrical signal by the voltage of the first reference electrical signal, and generating a third electrical signal having an oscillatory uniform voltage reflective of the magnitude of the division,
   13. electrically dividing the voltage of the second measurement electrical signal by the voltage of the second reference electrical signal and generating a fourth electrical signal having an oscillatory uniform voltage reflective of the magnitude of the division.
   14. sensing the maximum amplitude of the oscillating voltage of the third electrical signal and generating a fifth electrical signal having a voltage which is substantially constant and equal to the amplitude of the maximum voltage oscillation of the third signal,
   15. correlating the diameter of the capillary in terms of a predetermined constant multiplied by the square root of the value of the voltage of the fifth electrical signal,
   16. electrically determining the diameter of the capillary by determining the square root of the value of the voltage of the fifth electrical signal and multiplying the determined value of the square root of the voltage by the predetermined constant and generating a sixth electrical signal having a voltage reflective of the magnitude of the diametr of the capillary,
   17. electrically generating a seventh visually displayable signal which is the value of the diameter of the capillary,
   18. visually displaying the seventh signal which is the value of the diameter of the capillary,
   19. electrically comparing the voltage of the sixth electrical signal with maximum and minimum voltages reflective of maximum and minimum permissible values for the diameter of the capillary,
   20. electrically generating a visually displayed reject signal when the voltage of the sixth signal is either more than the maximum voltage or less than the minimum voltage, and
   21. visually displaying the reject signal in correlation with the visual display of the seventh signal which is the value of the diameter of the capillary,
   22. sensing the maximum amplitude of the oscillating voltage of the fourth electrical signal and generating an eighth electrical signal having a voltage which is substantially constant and equal to the amplitude of the maximum voltage oscillation of the fourth signal, 23. electrically determining the ratio of the eighth electrical signal to the fifth electrical signal by dividing the voltage of the eight signal by the voltage of the fifth signal and generating a ninth electrical signal having a voltage reflective of the magnitude of the ratio, 24. mathematically correlating the ratio of the length of the capillary to the diameter of the capillary in terms of a linear approximation of the ratio of the eighth electrical signal to the fifth electrical signal and the predetermined angle of the second measurement laser beam with regard to the axis of the spinneret, 25. electrically determining the ratio of the length of the capillary to the diameter of the capillary by adding a predetermined voltage to the product of the multiplication of the voltage of the ninth electrical signal by a predetermined value and generating a tenth electrical signal having a voltage reflective of the magnitude of the ratio of the length of the capillary to the diameter of the capillary, 26. electrically determining the length of the capillary by multiplying the voltage of the tenth electrical signal by a value selected from the group consisting of a value reflective of the nominal diameter of the capillary and a value reflective of the electrically determined diameter of the capillary and generating an eleventh electrical signal reflective of the magnitude of the length of the capillary, 27. electrically generating a twelfth visually displayable signal which is the value of the length of the capillary, 28. visually displaying the twelfth signal which is the value of the length of the capillary, 29. electrically comparing the voltage of the eleventh electrical signal with maximum and minimum voltages reflective of maximum and minimum permissible values for the length of the capillary, 30. electrically generating a visually displayable reject signal when the voltage of the eleventh signal is either more than the maximum voltage or less than the minimum voltage, and 31. visually displaying the reject signal in correlation with the visual display of the twelfth signal which is the value of the length of the capillary, the invention which is a method of control comprising A. generating a first periodic signal having a voltage directly proportional to time, B. responsive to the first periodic signal, periodically optically radially oscillating the first and second measurement laser beams across the circle defined by the centers of the plurality of orifices so as to position the first measurement laser beam at an angle with regard to the axis of the capillary that is proportional to the value of the voltage of the first periodic signal, C. generating a periodic sampling signal having a sampling period of predetermined duration, the sampling period corresponding in time to the maximum amplitude of the third electrical signal, D. sensing the value of th voltage of the first periodic signal during the sampling period of the periodic sampling signal, E. generating an error signal reflective of the magnitude of the sensed voltage of the first periodic signal during the sampling period of the periodic sampling signal, and F. radially translating the rotating spinneret at a rate reflective of the magnitude of the error signal.

2. The method of claim 1 further comprising generating a delayed first periodic signal having a voltage directly proportional to time, the amount of the delay being sufficient to correlate a zero voltage of the delayed first periodic signal with a zero angle between the first measurement laser beam amd the axis of the capillary.

3. In a method of measuring both the length and the diameter of a capillary of an orifice in a spinneret comprising 1. rotating about its axis a spinneret having a plurality of orifices disposed in a circle substantially concentric to the axis of the spinneret, at least a portion of each orifice defining a right cylinder capillary passageway, 2. generating a first and second laser beam, each beam having a size larger than the size of the capillary, 3. optically dividing the first laser beam into a first reference laser beam and a first measurement laser beam, 4. optically dividing the second laser beam into a second reference laser beam and a second measurement laser beam, 5. optically positioning the first measurement laser beam substanially parallel to the axis of the spinneret and upon an orifice in such a manner that the beam entirely covers the orifice and a portion of the beam passes through the capillary of the orifice, 6. optically positioning the second measurement laser beam at a predetermined angle with regard to the axis of the spinneret and upon te orifice in such a manner that the beam entirely covers the orifice and a position f the beam passes through the capillary of the orifice, 7. optically radially oscillating the first and second measurement laser beams across the circle defined by the centers of the plurality of orifices, the radial oscillation being at a suitable rate to allow the portion of the first and second beams to substantially simultaneously pass through the capillary of the orifice on at least three consecutive oscillations, 8. sensing the quantity and the nonuniform character of energy in a portion of the firt measurement laser beam passed through the capillary of the orifice by photoelectrically converting the light energy of the portion of the beam into a first measurement electrical signal having an oscillatory voltage reflective of the magnitutde and nonuniform character of the sensed energy, 9. sensing the quantity and the nonuniform character of energy in the poriton of the second measurement laser beam passed through the capillary of the orifice by photoelectrically converting the energy of the portion of the beam into a second measurement electrical signal having an oscillatory voltage reflective of the magnitude and nonunifirom character of the sensed energy, 10. sensing the nonuniform character of the energy in the first reference laser beam and generating a first reference electrical signal having a voltage reflective of the nonuniform character of the sensed energy,
11. sensing the nonuniform character of the energy in the portion of the second reference laser beam and generating a second reference electrical signal having a voltage reflective of the nonuniform character of the sensed energy,
12. electrically dividing the voltage of the firt measurement electrical signal by the voltage of the first reference electrical signal, and generating a third electrical signal having an oscillatory uniform voltage reflective of the magnitude of the division,
13. electrically dividing the voltage of the second measurement electrical signal by the voltage of the second reference electrical signal and generating a fourth electical signal having an oscillatory uniform voltage reflective of the magnitude of the division,
14. sensing the maximum amplitude of the oscillating voltage of the third electrical signal and generating a fifth electrical signal having a voltage which is substantially constant and equal to the amplitude of the maximum voltage oscillation of the third signal,
15. correlating the diameter of the capillary in terms of a predetermined constant multiplied by the square root of the value of the voltage of the fifth electrical signal,
16. electrically determining the diameter of the capillary by determining the square root of the value of the voltage by the predetermined constant and generating a sixth electrical signal having a voltage reflective of the magnitude of the diameter of the capillary,
17. electrically generating a seventh visually displayable signal which is the value of the diameter of the capillary,
18. visually displaying the seventh signal which is the value of the diameter of the capillary,
19. electrically comparing the voltage of the sixth electical signal with maximum and minimum voltages reflective of maximum and minimum permissible values for the diameter of the capillary,
20. electrically generating a visually displayed reject signal when the voltage of the sixth signal is either more than the maximum voltage or less than the minimum voltage, and
21. visually displaying the reject signal in correlation with the visual display of the seventh which is the value of the diameter of the capillary,
22. sensing the maximum amplitude of the oscillating voltage of the fourth electrical signal and generating an eighth electrical signal having a voltage which is substantially constant and equal to the amplitude of the maximum voltage oscillation of the fourth signal,
23. electrically determining the ratio of the eighth electrical signal to the fifth electrical signal by dividing the voltage of the eighth signal by the voltage of the fifth signal and generating a ninth electrical signal having a voltage reflective of the magnitude of the ratio,
24. mathematically correlating the ratio of the length of the capillary to the diameter of the capillary in terms of a linear approximation of the ratio of the eighth electrical signal to the fifth electrical signal and the predetermined angle of the second measurement laser beam with regard to the axis of the spinneret,
25. electrically determining the ratio of the length of the capillary to the diameter of the capillary by adding a predetermined voltage to the product of the multiplication of the voltage of the ninth electrical signal by a predetermined value and generating a tenth electrical signal having a voltage reflective of the magnitude of the ratio of the length of the capillary to the diameter of the capillary,
26. electrically determining the length of the capillary by multiplying the voltage of the tenth electrical signal by a value selected from the group consisting of a value refelective of the nominal diameter of the capillary and a value reflective fo the electrically determined diameter of the capillary and generating an eleventh electrical signal reflective of the magnitude of the length of the capillary,
27. electrically generating a twelfth visually displayable signal which is the value of the length of the capillary,
28. visually displaying the twelfth signal which is the value of the length of the capillary,
29. electrically comparing the voltage of the eleventh electrical signal with maximum and minimum voltages reflective of maximum and minimum permissible values for the length of the capillary,
30. electrically generating displayable reject signal when the voltage of the eleventh signal is either more than the maximum voltage or less than the minimum voltage, and
31. visually displaying the reject signal in correlation with the visual display of the twelfth signal which is the value of the length of the capillary, the invention which is a method of control comprising A. generating a first periodic signal having a square wave voltage,
B. integrating the square wave voltage of the first periodic signal to form a second periodic signal having a voltage directly proportional to time,
C. responsive to the second periodic signal, periodically optically radially oscillating the first and second measurement laser beams across the circle defined by the centers of the plurality of orifices so as to position the first measurement laser beam at an angle with regard to the axis of the capillary that is proportional to the value of the voltage of the second periodic signal
D. generating a delayed second periodic signal having a voltage directly proportional to time and having a zero voltage correlated in time with a zero angle between the first measurement laser beam and the axis of the capillary,
E. generating a periodic sampling signal having a sampling period of predetermined duration, the sampling period corresponding to time with the maximum amplitude of the third electrical signal,
F. sensing the value of the voltage of the delayed second periodic signal during the sampling period of the periodic sampling signal,
G. generating a constant voltage error signal having a magnitude reflective of the magnitude of the sensed value of the voltage of the delayed second periodic signal during the sampling period of the periodic sampling signal, H. radially the rotating spinneret at a rate reflective of the magnitude of the voltage of the constant voltage error signal.

4. The method of claim 3 wherein the periodic sampling signal is generated by
1. forming a first differentiated signal by differentiating the third electrical signal,
2. forming a first inverted square wave signal having an inverted voltage square wave, the wave having a sampling portion corresponding in time duration to the positive portion of the first differentiated signal,
3. forming a second differentiated signal by differentiating the first square wave signal,
4. forming a second inverted square wave signal having an inverted voltage square wave, the wave having a positive sampling portion corresponding in time duration to the negative portion of the second differentiated signal and having a negative sampling portion corresponding in time duration to the positive portion of the second differentiated signal, and
5. forming the periodic sampling signal by eliminating the negative sampling portion of the second inverted square wave signal.

5. In an apparatus for measuring both the length and the diameter of a capillary of an orifice in a spinneret comprising
1. a rotatably mounted member adapted to retain a spinneret and axially rotate the spinneret about the axis of the spinneret, the spinneret having a plurality of orifices disposed in a circle substantially concentric to the axis of the spinneret, each orifice defining a frustroconical passageway communicating with a right circular cylinder capillary passageway, the longer end of the frustro-conical passageway being oriented in the upstream position,
2. a means to rotate the rotatably mounted member comprising an electric motor mechanically engaged to the member,
3. a means to generate a first laser beam having a size larger than the size of the larger upstream end of the frustro-conical passageway of the orifice of the spinneret,
4. a means to generate a second laser beam having a size larger than the size of the capillary,
5. a first optical reflective means residing within the path of the first laser beam to reflect a portion of the first laser beam away from the path of the first laser beam to form a first reference laser beam, the means allowing the remaining portion of the first laser beam to pass through the means to form a first measurement laser beam,
6. a second optical reflecting means residing within the path of the second laser beam to reflect a portion of the second laser beam away from the path of the beam to form the second reference laser beam, the means allowing the remaining portion of the second laser beam to pass through the means to form the second measurement laser beam,
7. third optical reflecting means, residing in the path of the first measurement laser beam, to reflect the first measurement laser beam substantially parallel to the axis of the spinneret and upon an orifice in such a manner that the beam entirely covers the orifice and a portion of the beam passes through the capillary of the orifice, the third optical reflecting means being attached to an axially oscillable shaft positioned so as to oscillate the reflected beam radially across the circle defined by the center of the plurality of orifices of the spinneret,
8. a fourth optical reflecting means, residing in the path of the second measurement laser beam, the means attached to the axially oscillable shaft so as to reflect the second measurement laser beam at a perdetermined angle with regard to the axis of the spinneret and upon the orifice in such a manner that the beam entirely covers the orifice and a portion of the beam passes through the capillary of the orifice,
9. a means to oscillate the axially oscillable shaft at a rate to allow the portion of the first and second beams to substantially simultaneously pass through the capillary of the orifice on at least three consecutive oscillations,
10. a first photoelectric means to sense the quantity and the nonuniform character of energy in the portion of the first measurement laser beam passed through the capillary of the orifice and convert the energy of the light in the portion of the beam into a first measurement electrical signal having an oscillatory voltage reflective of the magnitude and nonuniform character of the sensed energy,
11. a second photoelectric means to sense the quantity and the nonuniform character of energy in the portion of the second measurement laser beam passed through the capillary of the orifice and convert the energy of the light in the portion of the beam into a second measurement electrical signal having an oscillatory voltage reflective of the magnitude and nonuniform character of the sensed energy,
12. a third photoelectric means, residing in the path of the first reference laser beam, to sense the nonuniform character of the energy in the first reference laser beam and generate a first reference electrical signal having a voltage reflective of the nonuniform character of the sensed energy,
13. a fourth photoelectric means, residing in the path of the second reference laser beam to sense the nonuniform character of the energy in the portion of the second reference laser beam and generate a second reference electrical signal having a voltage reflective of the nonuniform character of the sensed energy,
14. an electrical means to electrically divide the voltage of the first measurement electrical signal by the voltage of the first reference electrical signal, and generate a third electrical signal having an oscillatory uniform voltage reflective of the magnitude of the division,
15. an electrical means to electrically divide the voltage of the second measurement electrical signal by the voltage of the second reference electrical signal and generate a fourth electrical signal having an oscillatory uniform voltage reflective of the magnitude of the division,
16. a means to sense the maximum amplitude of the oscillating voltage of the third electrical signal and generate a fifth electrical signal having a voltage which is substantially constant and equal to the amplitude of the maximum voltage oscillation of the third signal, 17. a means to electrically determine the diameter of the capillary by determining the square root of the voltage of the fifth electrical signal and multiplying the determined value of the square root of the voltage by a predetermined constant, the means generating a sixth electrical signal having a voltage reflective of the diameter of the capillary,
18. a means to electrically generate a seventh visually displayable signal which is the value of the diameter of the capillary,
19. a means to visually display the seventh signal which is the value of the diameter of the capillary,
20 a means to electrically compare the voltage of the sixth electrical signal with maximum and minimum voltages reflective of the maximum and minimum permissible values for the diameter of the capillary,
21. a means to electrically generate a visually displayable reject signal when the voltage of the sixth signal is either more than the maximum voltage or less than the minimum voltage, and
22. a means to visually display the reject signal in correlation with the visual display of the seventh signal which is the value of the diameter of the capillary,
23. a means to sense the maximum amplitude of the oscillating voltage of the fourth electrical signal and generate an eighth electrical signal having a voltage which is substantially constant and equal to the amplitude of the maximum voltage oscillation of the fourth signal,
24. a means to electrically determine the ratio of the eighth electrical signal to the fifth electrical signal by dividing the voltage of the eighth signal by the voltage of the fifth signal and generate a ninth electrical signal having a voltage reflective of the magnitude of the ratio,
25. a means to electrically determine the ratio of the length of the capillary to the diameter of the capillary by adding a predetermined voltage to the product of the multiplication of the voltage of the ninth electrical signal by a predetermined value and generate a tenth electrical signal having a voltage reflective of the magnitude of the ratio of the length of the capillary to the diameter of the capillary,
26. a means to electrically determine the length of the capillary by multiplying the voltage of the tenth electrical signal by a value selected from the group consisting of a valve reflective of the nominal diameter of the capillary and a value reflective of the electrically determined diameter of the capillary, and generate an eleventh electrical signal reflective of the magnitude of the length of the capillary,
27. a means to electrically generate a twelfth visually displayable signal which is the value of the length of the capillary,
28. a means to visually display the twelfth signal which is the value of the length of the capillary,
29. a means to electrically compare the voltage of the eleventh electrical signal with the maximum and minimum voltages reflective of maximum and minimum permissible values for the length of the capillary,
30. a means to electrically generate a visually displayable reject signal when the voltage of the eleventh siganal is either more than the maximum voltage or less than the minimum voltage, and
31. a means to visually display the reject signal in correlation with theh visual display of the twelfth signal which is the value of the length of the capillary, the invention which is a control apparatus comprising
A. a means to generate a first periodic signal having a voltage directly proportional to time,
B. a means responsive to the first periodic signal to oscillate the axially oscillable shaft so as to position the first beam at an angle with regard to the axis of the capillary that is proportional to the value of the voltage of the first periodic signal,
C. a means to generate a periodic sampling signal having a sampling period of predetermined duration, the sampling period corresponding in time to the maximum amplitude of the third electrical signal,
D. a means to sense the value of the voltage of the first periodic signal during the sampling period of the periodic sampling signal,
E. a means to generate an error signal reflective of the magnitude of the sensed voltage of the first periodic signal during the sampling period of the periodic sampling signal, and
F. a means to radially translate the rotating spinneret at a rate reflective of the magnitude of the error signal.

6. The apparatus of claim 5 further comprising a means to generate a delayed first periodic signal having a voltage directly proportional to time, the amount of the delay being sufficient to correlate a zero voltage of the delayed first periodic signal with a zero angle between the first measurement laser beam and the axis of the capillary.

7. In an appratus for measuring both the length and the diameter of a capillary of an orifice in a spinneret comprising
1. a rotatably mounted member adapted to retain a spinneret and axially rotate the spinneret about the axis of the spinneret, the spinneret having a plurality of orifices disposed in a circle substantially concentric to the axis of the spinneret, each orifice defining a frustro-conical passageway communicating with a right circular cylinder capillry passageway, the larger end of th frustro-conical passageway being oriented in the upstream position,
2. a means to rotate the rotatably mounted member comprising an electric motor mechanically engaged to the member,
3. a means to generate a first laser beam having a size larger than the size of the larger upstream end of the frustro-conical passageway of the orifice of the spinneret,
4. a means to generate a second laser beam having a size larger than the size of the capillary,
5. a first optical reflective means residing within the path of the first laser beam to reflecting a portion of the first laser beam to form a first reference laser beam, the means allowing the remaining portion of the first laser beam to pass through the means to form a first measurement laser beam,
6. a second optical reflecting means residing within the path oof the second laser beam to reflect a portion of the second laser beam away from the path of the beam to form the second reference laser beam, the means allowing the reamaining portion of the second laser beam to pass through the means to form the second measurement laser beam,
7. third optical reflecting means, residing in the path of the first measurement laser beam, to reflect the first measurement laser beam substantially parallel to the axis of the spinneret and upon an orifice in such a manner that the beam entirely covers the orfice and portion of the beam passes through the capillary of the orifice, the third optical reflecting means being attached to an axially oscillable shaft positioned so as to oscillate the reflected beam radially across the circle defined by the center of plurality of orifices of the spinneret, 8. a fourth optical reflecting means, residing in the path of the second measurement laser beam, the means attached to the axially oscillable shaft so as to reflect the second measurement laser beam at a predetermined angle with regard to the axis of the spinneret and upon the orifice in such a manner that the beam entirely covers the orifice and a poriton of the beam passes through the capillary of the orifice, 9. a means to oscillate the axially ocillable shaft at a rate to allow the portion of the first and second beams to substantially simultaneously pass through the capillary of the orifice on at least three consecutive oscillations, 10. a first photoelectric means to sense the quantity and the nonuniform character of energy in the portion of the first measurement laser beam passed through the capillary of the orifice and convert the energy of the light in the portion of the beam into a first measurement electrical signal having an oscillatory voltage reflective of the magnitude and nonuniform character of the sensed energy, 11. a second photoelectric means to sense the quantity and the nonuniform character of energy in the portion of the second measurement laser beam passed through the capillary of the orifice and convert the energy of the light in the portion of the beam into a second measurement electrical signal having an osciallatory voltage reflective of the magnitude and nonuniform character of the sensed energy, 12. a third photoelectric means, residing in the path of the first reference laser beam, to sense th nonuniform character of the energy in the first reference laser beam and generate a first reference electrical signal having a voltage reflective of the nonuniform character of the sensed energy, 13. a fourth photoelectric means, residing in the path of the second reference laser beam to sense the nonuniform character of the energy in the portion of the second reference laser beam and generate a second reference electrical signal having a voltage reflective of the nonuniform character of the sensed energy, 14. an electrical means to electrically divide the voltage of the first measurement electrical signal by the voltage of the first reference electrical signal, and generate a third electrical signal having an oscillatory uniform voltage reflective of the magnitude of the division, 15. an electrical means to electrically divide the voltage of the second measurement electrical signal by the voltage of the second reference electrical signal and generate a fourth electrical having an oscillatory uniform voltage reflective of the magnitude of the division, 16. a means to sense the maximum amplitude of the oscillating voltage of the third electrical signal and generate a fifth electrical signal having a voltage which is substantially constant and equal to the amplitude of the maximum voltage oscillation of the third signal, 17. a means to electrically determine the diameter of the capillary by determining the square root of the voltage of the fifth electrical signal and multiplying the detemined value of the square root of the voltage by a predetermined constant, the means generating a sixth electrical signal having a voltage reflective of the diameter of the capillary, 18. a means to electrically generate a seventh visually displayable signal which is the value of the diameter of the capillary, 19. a means to visually display the seventh signal which is the value of the diameter of the capillary, 20. a means to electrically compare the voltage of the sixth electrical signal with maximum and minimum voltages reflective of maximum and minimum permissible values for the diameter of the capillary, 21. a means to electrically generate a visually displayable reject signal when the voltage of the sixth signal is either less than the maximum voltage or more than the maximum voltage, and 22. a means to visually display the reject signal in correlation with the visual display of the seventh signal which is the value of the diameter of the capillary, 23. a means to sense the maximum amplitude of the oscillating voltage of the fourth electrical signal and generate an eighth electrical signal having a voltage which is substantially constant and equal to the amplitude of the maximum voltage oscillation of the fourth signal, 24. a means to electrically determine the ratio of the eighth electrical signal to the fifth electrical signal by dividing the voltage of the eighth signal by the voltage of the fifth signal and generate a ninth electrical signal having a voltage reflective of the magnitude of the ratio, 25. a means to electrically determine the ratio of the length of the capillary to the diameter of hte capillary by adding a predetermined voltage to the product of the multiplication of the voltage of the ninth electrical signal by a predetermined value and generate a tenth electrical signal having a voltage reflective of the capillary to the diameter of the capillary, 26. a means to electrically determine the length of the capillary by multiplying the voltage of the tenth electrical signal by a valve selected from the group consisting of a value reflective of the nominal diameter of the capillary and a value reflective of the electrically determined diameter of the capillary, and generate an eleventh electrical signal reflective of the magnitude of the length of the capillary, 27. a means to electrically generate a twelfth visually displayable signal which is the value of the length of the capillary, 28. a means to visually display the twelfth signal which is the value of the length of the capillary, 29. a means to electrically compare the voltage of the eleventh electrical signal with the maximum and minimum voltages reflective of maximum and minimum permissiible values for the length of the capillary, 30. a means to electrically generate a visually displayable reject signal when the voltage of the eleventh signal is either less than the maximum voltage or more than the maximum voltage, and 31. a means to visually display the reject signal in correlation with the visual display of the twelfth signal which is the value of the length of the capillary, the invention which is a control apparatus comprising A. a means to generate a first periodic signal having a square wave voltage, B. a means to integrate the square wave voltage of the first periodic signal to form a second periodic signal having a voltage directly proportional to time, C. a means responsive second the secnd periodic signal to oscillate the axially oscillable shaft so as to position the first measurement laser beam at an angle with regard to the axis of the capillary that is proportional to the value of the voltage of the second periodic signal, D. a means to generate a delayed second periodic signal having a voltage directly proportional to time and having zero voltage correlated in time with a zero angle between the first measurement laser beam and the axis of the capillary, E. a means to generate a periodic sampling signal havng a sampling period of predetermined duration, the sampling period corresponding in time with the maximum amplitude of the third electical signal, F. a means to sense the value of the voltage of the delayed second periodic signal during the sampling period of hte periodic sampling signal, G. a means to generate a constant voltage error signal having a magnitude reflective of the magnitude of the sensed value of the voltage of the delayed second periodic signal during the sampling period of the periodic sampling signal, H. a means to radially translate the rotating spinneret at a rate reflective of the magnitude of the voltage of the constant voltage error signal.

8. The appartus of claim 7 wherein to generate the periodic sampling signal comprises 1. a means to form a first differentiated signal by difereintiating the third electrical signal, 2. a means to form a first inverted square wave signal having an inverted voltage square wave, the wave having a sampling portion corresponding in time duration to the positive portion of the first differentiated signal, 3. a means to form a second differentiated signal by differentiating the first square wave signal, 4. a means to form a second inverted square wave signal having an inverted voltage square wave, the wave having a positive sampling portion corresponding in time duration to the negative portion of the second differentiated signal and having a negative sampling portion corresponding in time duration to the positive portion of the second differentiated signal, and 5. a means to form the periodic sampling signal by eliminating the negative sampling portion of the second inverted square wave signal.

* * * * *

UNITED STATES PATENT OFFICE
CERTIFICATE OF CORRECTION

Patent No. 3,873,211                      Dated  March 25, 1975

Inventor(s) Robert L. Watson

It is certified that error appears in the above-identified patent and that said Letters Patent are hereby corrected as shown below:

Column 22, Claim 3, Section 6, line 3, "te" should be ---the---; line 5, "f" should be ---of---; Section 8, line 2, "firt" should be ---first---; Section 9, line 2, "poriton" should be ---portion---; Section 12, line 1, "firt" should be --first---.

Column 23, Claim 3, Section 16, line 2, after "voltage" insert ---of the fifth electrical signal and multiplying the determined value of the square root of the voltage---; Section 19, line 2, "electical" should be ---electrical---; Section 21, line 2, after "seventh" insert ---signal---; Section 26, line 4, "refelective" should be ---reflective--; Section 30, after "generating" insert ---a visually---; Section 31, E, line 3, "to" should be ---in---.

Column 27, Claim 5, Section 26, line 4, "valve" should be ---value---; Section 30, line 3, "siganal" should be ---signal---; Section 31, line 2, "theh" should be ---the---.

Column 28, Claim 7, Section 1, line 7, "capillry" should be --capillary---; Section 5, line 3, after "beam" insert ---away from the path of the first laser beam---; Section 6, line 2, "oof" should be ---of---; line 5, "reamaining" should be ---remaining---; Section 9, line 1, "ocillable" should be ---oscillable---; Section 11, line 7, "osciallatory" should be ---oscillatory---; Section 12, line 2, "th" should be ---the---; Section 15, line 4, after "electrical" insert ---signal---; Section 17, line 4, "detemined" should be ---determined---; Section 25, line 7, after "of" insert ---the magnitude of the ratio of the length of---; Section 26, line 3, "valve" should be ---value---; Section 29, line 4, "permissiible" should be ---permissible---; Section 31, C, line 1, "second" first occurrence should be ---to---, and "secnd" should be ---second---; Section 31, E, line 2, "havng" should be ---having---; Section 31, F, line 3, "hte" should be ---the---.

UNITED STATES PATENT OFFICE
CERTIFICATE OF CORRECTION

Patent No. 3,873,211      Dated March 25, 1975

Inventor(s) Robert L. Watson

It is certified that error appears in the above-identified patent and that said Letters Patent are hereby corrected as shown below:

Claim 8, line 1, "appartus" should be ---apparatus---, and after "wherein" insert ---the means---; Section 1, line 2, "fereintiating" should be ---ferentiating---.

Signed and sealed this 1st day of July 1975.

(SEAL)
Attest:

RUTH C. MASON
Attesting Officer

C. MARSHALL DANN
Commissioner of Patents
and Trademarks